(12) United States Patent
Treseler et al.

(10) Patent No.: US 10,719,786 B1
(45) Date of Patent: Jul. 21, 2020

(54) EVENT TICKETING IN ONLINE SOCIAL NETWORKS

(71) Applicant: Facebook, Inc., Menlo Park, CA (US)

(72) Inventors: Colin Patrick Treseler, San Francisco, CA (US); Edward William Laves, Oakland, CA (US); Yi Fei Chen, Menlo Park, CA (US); Eran Izhak Hirsch, Herzliya (IL); Adam Michael Creasman, Monte Sereno, CA (US); Gregory Stephen Williams, Sunnyvale, CA (US); Oussama Hariz, San Francisco, CA (US); Luiz Gustavo Cardoso Ribeiro, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 890 days.

(21) Appl. No.: 14/593,723

(22) Filed: Jan. 9, 2015

(51) Int. Cl.
*G06Q 10/00* (2012.01)
*G06Q 10/02* (2012.01)
*G06Q 50/00* (2012.01)

(52) U.S. Cl.
CPC ............. *G06Q 10/02* (2013.01); *G06Q 50/01* (2013.01)

(58) Field of Classification Search
None
See application file for complete search history.

(56) References Cited

U.S. PATENT DOCUMENTS

| | | | | |
|---|---|---|---|---|
| 7,093,130 B1* | 8/2006 | Kobayashi | ............. | G06F 21/64 705/67 |
| 8,379,874 B1* | 2/2013 | Simon | ................... | H04R 3/005 381/1 |
| 8,560,395 B2* | 10/2013 | Walker | ............... | G06Q 30/0241 705/26.1 |
| 8,887,035 B2* | 11/2014 | McDonald | ............. | G06Q 10/00 715/203 |
| 8,935,275 B2* | 1/2015 | Rathod | ................... | G06Q 10/00 707/769 |
| 2007/0276707 A1* | 11/2007 | Collopy | ................. | G06Q 10/02 705/5 |
| 2008/0243628 A1* | 10/2008 | Wiseman | ............... | G06Q 30/04 705/26.1 |
| 2011/0078166 A1* | 3/2011 | Oliver | ................... | G06F 16/832 707/760 |
| 2012/0166432 A1* | 6/2012 | Tseng | ................ | G06F 17/30867 707/728 |

(Continued)

*Primary Examiner* — Tonya Joseph
(74) *Attorney, Agent, or Firm* — Baker Botts L.L.P.

(57) ABSTRACT

A method includes identifying an event corresponding to an event node of a social graph associated with a social-networking system, where the social graph includes nodes and edges connecting the nodes, and the event node is connected to ticket nodes corresponding to tickets for the event. The nodes include a first user node corresponding to a first user of the social-networking system, and second nodes, each of which corresponds to a concept or to one of a plurality of second users of the social-networking system. The method further includes receiving a request to assign a selected one of the tickets for the event to the first user, and creating an edge between the first user node and a selected one of the ticket nodes, where the selected ticket node corresponds to the selected ticket.

17 Claims, 13 Drawing Sheets

(56) References Cited

U.S. PATENT DOCUMENTS

| | | | | |
|---|---|---|---|---|
| 2013/0096961 | A1* | 4/2013 | Owens | G06Q 10/02 |
| | | | | 705/5 |
| 2013/0227011 | A1* | 8/2013 | Sharma | G06Q 30/0241 |
| | | | | 709/204 |
| 2014/0067937 | A1* | 3/2014 | Bosworth | G06Q 50/01 |
| | | | | 709/204 |
| 2014/0280108 | A1* | 9/2014 | Dunn | G06F 16/248 |
| | | | | 707/728 |
| 2014/0280566 | A1* | 9/2014 | Chen | H04L 67/306 |
| | | | | 709/204 |
| 2014/0379390 | A1* | 12/2014 | Scarborough | G06Q 30/0639 |
| | | | | 705/5 |
| 2016/0005012 | A1* | 1/2016 | Goetz | G06Q 20/123 |
| | | | | 705/5 |
| 2016/0005197 | A1* | 1/2016 | Walker | G06T 11/206 |
| | | | | 345/440 |

* cited by examiner

1000

Find Available Tickets

Number of tickets [2] — 1002    ☐ Adjacent — 1004

---

*Find by Event Attributes*

Event Name [Rihanna] — 1006

Event Date [November 8, 2014] — 1008    Time [ ] — 1010

Venue [Shoreline Ampitheater] — 1012

City [ ] — 1014    State [ ] — 1016

---

*Find by Event Identifier*

Event Identifier [ ] — 1018

---

Tier: ☐ General Admission ☐ Balcony ☐ VIP ■ Any — 1020

1022 — ( Find Tickets )

Available Tickets

Rihanna at the Shoreline Amphitheater
November 8, 2014 at 8:00 PM — 1026

1028 —

| Select | Tier | Seat | Price | Ticket Identifier |
|---|---|---|---|---|
| ■ | General Admission | 31D | $29.00 | 5D315F432A |
| ■ | General Admission | 33D | $29.00 | 5D315F867C |
| ☐ | Balcony | 85E | $25.00 | 5D316A227A |
| ☐ | VIP | 112A | $79.00 | 5D318A123B |

Tickets selected: 2   Total: $53.00 (2 x $29.00 + tax and fees)

1030 — ( Purchase )

EVENT TICKETING IN ONLINE SOCIAL NETWORKS

TECHNICAL FIELD

This disclosure generally relates to event ticket reservations within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

Social-networking system users may organize events, such as concerts, theater performances, sports games, or other social events, and sell or transfer tickets for the events to other users. A user who plans an event may add information about the event, such as an event page, to the social network. The event page may include a ticket purchasing link. Other users may then access this page to find out about the event and purchase tickets for the event. The event page may include details about the event, such as a description, location, date, and time. Social-networking system users may redeem the purchased tickets for admission to the event. The social-networking system therefore provides a social interface to event-ticketing operations, such as ticket distribution, purchasing, and redemption.

Third parties, such as online ticketing services and event venues, may authorize the social-networking system to sell tickets on their behalf. The social-networking system may initiate ticket sale transactions and invoke third-party servers to perform ticketing operations, such as transaction fulfillment for ticket purchases. The third-party servers may also provide data related to events, venues, and ticket availability. The social-networking system may interact with third-party systems to obtain event and ticket data, and store the data in the social graph as event nodes and ticket nodes. Applications, pages, and other social-network entities can access the ticketing data in the event and ticket nodes. Users may create events, search for existing events and tickets, and reserve, purchase, transfer, or redeem tickets via user interfaces in the social-networking system. The social-networking system may interact with the third-party servers to invoke operations that perform these actions and return results to the social-networking system.

The embodiments disclosed above are only examples, and the scope of this disclosure is not limited to them. Particular embodiments may include all, some, or none of the components, elements, features, functions, operations, or steps of the embodiments disclosed above.

BRIEF DESCRIPTION OF THE DRAWINGS

FIG. 10A illustrates an example user interface for requesting ticket availability in a social-networking system.

FIG. 10B illustrates an example user interface for purchasing tickets for events in a social-networking system.

DESCRIPTION OF EXAMPLE EMBODIMENTS

Figure 1:
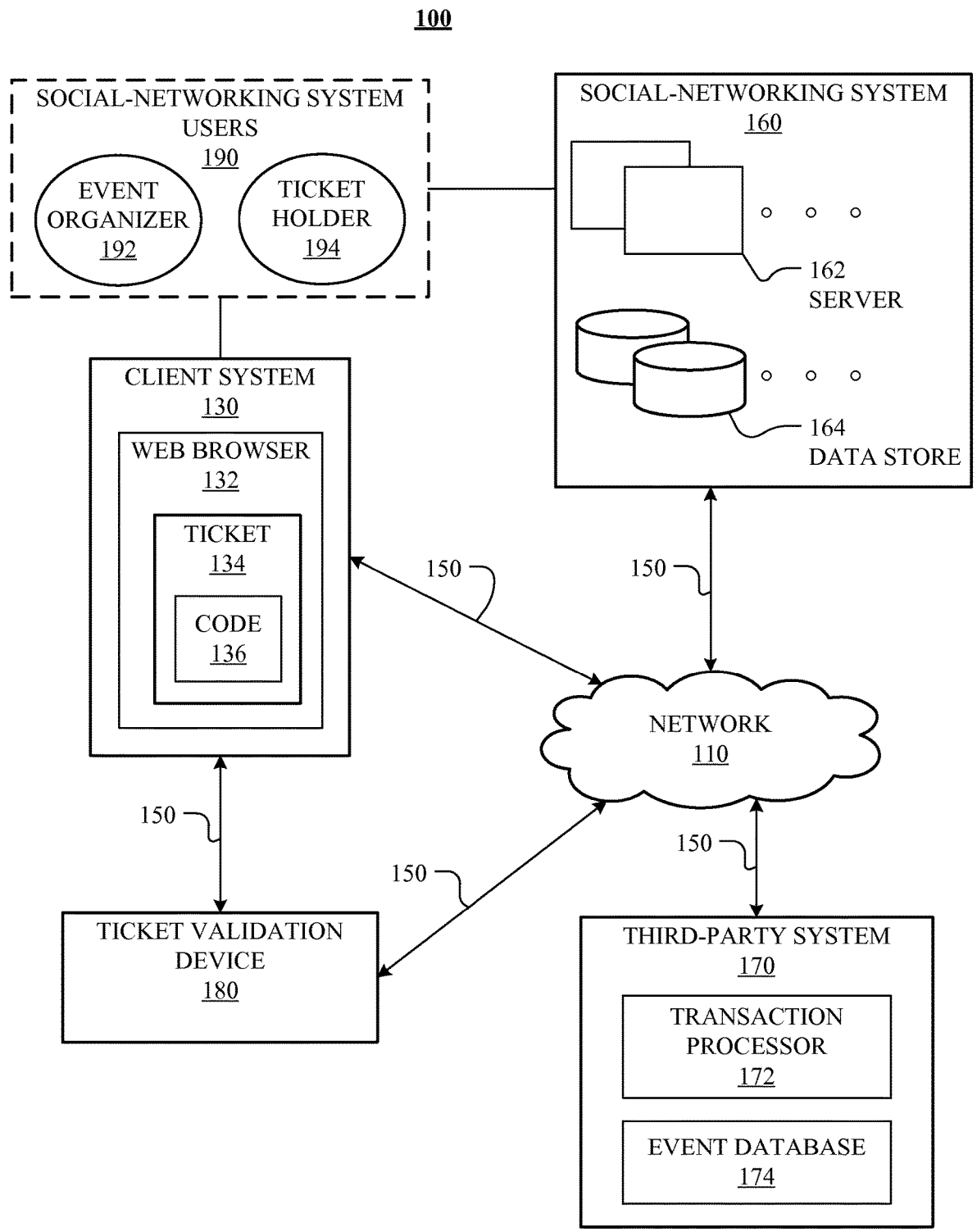
FIG. 1 illustrates an example network environment for a social-networking system.

FIG. 1 illustrates an example network environment 100 associated with a social-networking system. Network environment 100 includes a client system 130, a social-networking system 160, and a third-party system 170 connected to each other by a network 110. Although FIG. 1 illustrates a particular arrangement of client system 130, social-networking system 160, third-party system 170, and network 110, this disclosure contemplates any suitable arrangement of client system 130, social-networking system 160, third-party system 170, and network 110. As an example and not by way of limitation, two or more of client system 130, social-networking system 160, and third-party system 170 may be connected to each other directly, bypassing network 110. As another example, two or more of client system 130, social-networking system 160, and third-party system 170 may be physically or logically co-located with each other in whole or in part. Moreover, although FIG. 1 illustrates a particular number of client systems 130, social-networking systems 160, third-party systems 170, and networks 110, this disclosure contemplates any suitable number of client systems 130, social-networking systems 160, third-party systems 170, and networks 110. As an example and not by way of limitation, network environment 100 may include multiple client system 130, social-networking systems 160, third-party systems 170, and networks 110.

This disclosure contemplates any suitable network 110. As an example and not by way of limitation, one or more portions of network 110 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 110 may include one or more networks 110.

Links 150 may connect client system 130, social-networking system 160, and third-party system 170 to communication network 110 or to each other. This disclosure contemplates any suitable links 150. In particular embodiments, one or more links 150 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 150 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 150, or a combination of two or more such links 150. Links 150 need not necessarily be the same throughout network environment 100. One or more first links 150 may differ in one or more respects from one or more second links 150.

In particular embodiments, client system 130 may be an electronic device including hardware, software, or embedded logic components or a combination of two or more such components and capable of carrying out the appropriate functionalities implemented or supported by client system 130. As an example and not by way of limitation, a client system 130 may include a computer system such as a desktop computer, notebook or laptop computer, netbook, a tablet computer, e-book reader, GPS device, camera, personal digital assistant (PDA), handheld electronic device, cellular telephone, smartphone, other suitable electronic device, or any suitable combination thereof. This disclosure contemplates any suitable client systems 130. A client system 130 may enable a network user at client system 130 to access network 110. A client system 130 may enable its user to communicate with other users at other client systems 130.

In particular embodiments, client system 130 may include a web browser 132, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client system 130 may enter a Uniform Resource Locator (URL) or other address directing the web browser 132 to a particular server (such as server 162, or a server associated with a third-party system 170), and the web browser 132 may generate a Hyper Text Transfer Protocol (HTTP) request and communicate the HTTP request to server. The server may accept the HTTP request and communicate to client system 130 one or more Hyper Text Markup Language (HTML) files responsive to the HTTP request. Client system 130 may render a webpage based on the HTML files from the server for presentation to the user. This disclosure contemplates any suitable webpage files. As an example and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, social-networking system 160 may be a network-addressable computing system that can host an online social network. Social-networking system 160 may generate, store, receive, and send social-networking data, such as, for example, user-profile data, concept-profile data, social-graph information, or other suitable data related to the online social network. Social-networking system 160 may be accessed by the other components of network environment 100 either directly or via network 110. In particular embodiments, social-networking system 160 may include one or more servers 162. Each server 162 may be a unitary server or a distributed server spanning multiple computers or multiple datacenters. Servers 162 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 162 may include hardware, software, or embedded logic components or a combination of two or more such components for carrying out the appropriate functionalities implemented or supported by server 162. In particular embodiments, social-networking system 164 may include one or more data stores 164. Data stores 164 may be used to store various types of information. In particular embodiments, the information stored in data stores 164 may be organized according to specific data structures. In particular embodiments, each data store 164 may be a relational, columnar, correlation, or other suitable database. Although this disclosure describes or illustrates particular types of databases, this disclosure contemplates any suitable types of databases. Particular embodiments may provide interfaces that enable a client system 130, a social-networking system 160, or a third-party system 170 to manage, retrieve, modify, add, or delete, the information stored in data store 164.

In particular embodiments, social-networking system 160 may store one or more social graphs in one or more data stores 164. In particular embodiments, a social graph may include multiple nodes—which may include multiple user nodes (each corresponding to a particular user) or multiple concept nodes (each corresponding to a particular concept)—and multiple edges connecting the nodes. Social-networking system 160 may provide users of the online social network the ability to communicate and interact with other users. In particular embodiments, users may join the online social network via social-networking system 160 and then add connections (e.g., relationships) to a number of other users of social-networking system 160 whom they want to be connected to. Herein, the term "friend" may refer to any other user of social-networking system 160 with whom a user has formed a connection, association, or relationship via social-networking system 160.

In particular embodiments, social-networking system 160 may provide users with the ability to take actions on various types of items or objects, supported by social-networking system 160. As an example and not by way of limitation, the items and objects may include groups or social networks to which users of social-networking system 160 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in social-networking system 160 or by an external system of third-party system 170, which is separate from social-networking system 160 and coupled to social-networking system 160 via a network 110.

In particular embodiments, social-networking system 160 may be capable of linking a variety of entities. As an example and not by way of limitation, social-networking system 160 may enable users to interact with each other as well as receive content from third-party systems 170 or other entities, or to allow users to interact with these entities through an application programming interfaces (API) or other communication channels.

In particular embodiments, a third-party system 170 may include one or more types of servers, one or more data stores, one or more interfaces, including but not limited to APIs, one or more web services, one or more content sources, one or more networks, or any other suitable components, e.g., that servers may communicate with. A third-party system 170 may be operated by a different entity from an entity operating social-networking system 160. In particular embodiments, however, social-networking system 160 and third-party systems 170 may operate in conjunction with each other to provide social-networking services to users of social-networking system 160 or third-party systems 170. In this sense, social-networking system 160 may provide a platform, or backbone, which other systems, such as third-party systems 170, may use to provide social-networking services and functionality to users across the Internet.

In particular embodiments, a third-party system 170 may include a third-party content object provider. A third-party content object provider may include one or more sources of content objects, which may be communicated to a client system 130. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, social-networking system 160 also includes user-generated content objects, which may enhance a user's interactions with social-networking system 160. User-generated content may include anything a user can add, upload, send, or "post" to social-networking system 160. As an example and not by way of limitation, a user communicates posts to social-networking system 160 from a client system 130. Posts may include data such as status updates or other textual data, location information, photos, videos, links, music or other similar data or media. Content may also be added to social-networking system 160 by a third-party through a "communication channel," such as a newsfeed or stream.

In particular embodiments, social-networking system 160 may include a variety of servers, sub-systems, programs, modules, logs, and data stores. In particular embodiments, social-networking system 160 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Social-networking system 160 may also include suitable components such as network interfaces, security mechanisms, load balancers, failover servers, management-and-network-operations consoles, other suitable components, or any suitable combination thereof. In particular embodiments, social-networking system 160 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking social-networking system 160 to one or more client systems 130 or one or more third-party systems 170 via network 110. The web server may include a mail server or other messaging functionality for receiving and routing messages between social-networking system 160 and one or more client systems 130. An API-request server may allow a third-party system 170 to access information from social-networking system 160 by calling one or more APIs. An action logger may be used to receive communications from a web server about a user's actions on or off social-networking system 160. In conjunction with the action log, a third-party-content-object log may be maintained of user exposures to third-party-content objects. A notification controller may provide information regarding content objects to a client system 130. Information may be pushed to a client system 130 as notifications, or information may be pulled from client system 130 responsive to a request received from client system 130. Authorization servers may be used to enforce one or more privacy settings of the users of social-networking system 160. A privacy setting of a user determines how particular information associated with a user can be shared. The authorization server may allow users to opt in to or opt out of having their actions logged by social-networking system 160 or shared with other systems (e.g., third-party system 170), such as, for example, by setting appropriate privacy settings. Third-party-content-object stores may be used to store content objects received from third parties, such as a third-party system 170. Location stores may be used for storing location information received from client systems 130 associated with users. Advertisement-pricing modules may combine social information, the current time, location information, or other suitable information to provide relevant advertisements, in the form of notifications, to a user.

In particular embodiments, social-networking system 160 may handle event-related ticket transactions (e.g., sales, exchanges, or refunds of tickets 134 for social-networking users 190, event configuration for event organizers 192, transfers of tickets 134 between ticket holders 194, and validation of tickets 134 (e.g., by a web service) presented by a ticket holder 194 for redemption at an event.

In some embodiments, social-networking system 160 may retrieve information about events from a server of the third-party system 170. The third-party system 170 may be an online ticket sales system that sells tickets 134 for events such as concerts, sports games, and so on. The third-party system 170 may include an event database 174 that stores data related to events 154, such as event details, ticket information, venue information, ticket sales information, ticket pricing, and the like. The third-party system 170 also may include a transaction processor 172 that performs transaction fulfillment for ticket purchases, exchanges, refunds, and other event-related transactions. In some embodiments, the event-related functionality and data provided by the third-party system 170 may be provided by social-networking system 160.

The social-networking system 160 interacts with social-networking system users 190, who may purchase or otherwise acquire tickets 134. At least one of the social-networking system users 190 may be an event organizer 192. An event organizer 192 may create a representation of the event in the social-networking system 162 (e.g., represented by a concept node) and request that tickets 134 be allocated or reserved for social-networking system users 190. Upon acquiring tickets 134, users 190 may become ticket holders 194. Social-networking system users 190 may receive tickets 134 in exchange for payment or as gifts. Event organizers may also be ticket holders 194 for events organized by other users 190. Each ticket 134 may be represented by a node in a social graph stored in a data store 164 of the social-networking system 160. Information about tickets 134 may also be stored in the event database 174 of the third-party system 170. Tickets 134 may be provided to a ticket holder 194 in physical form (e.g., a paper ticket) or in electronic form on a client system 130 associated with the ticket holder 194 (e.g., information sent to ticket holder 194 by way of an email, a web browser 132, or another application installed on client system 130, as shown in FIG. 1).

In particular embodiments, a ticketholder 194 may be admitted to an event held at an event venue if the ticketholder 194 has a valid ticket 134 for the event. A ticket validator, such as a person monitoring an entry point to the event venue, may decide whether to admit the ticketholder 194 to the event. The ticket validator may use a ticket validation device 180 to check the validity of ticket 134 based on a ticket code 136 associated with the ticket (e.g., displayed on ticket 134). In particular embodiments, ticket validation device 180 may transmit ticket code 136 (or one or more values derived therefrom) to the social-networking system, which may use the information to determine a unique ticket node identifier and a unique user node identifier, and then determine whether an edge between that ticket node and that user node exists. In particular embodiments, ticket code 136 may be encoded as an optically-recognizable image, such as a QR code, and ticket validation device 180 may include an optical scanner for scanning and decoding the code 136. In particular embodiments, the ticket code 136 may be transmitted as an audio signal by client system 130 that is detected by ticket validation device 180. In particular embodiments, the ticket code 136 may be transmitted as a wireless communication (e.g., as a Radio Frequency Identifier (RFID) transmission). The decoded value may be evaluated and compared to information received from the social-networking system 160 to determine whether the ticket 134 is valid.

Figure 2:
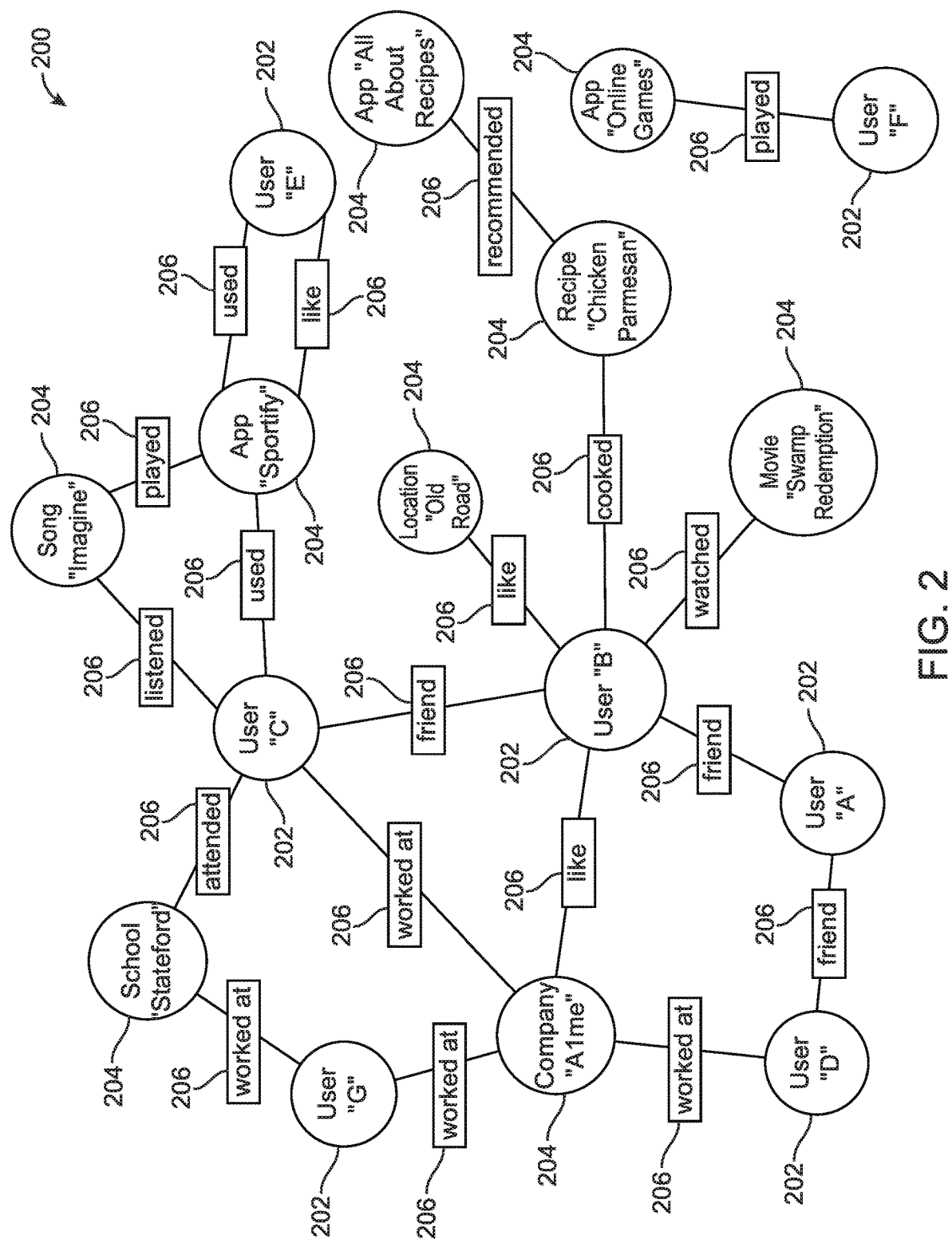
FIG. 2 illustrates an example social graph.

FIG. 2 illustrates example social graph 200. In particular embodiments, social-networking system 160 may store one or more social graphs 200 in one or more data stores. In particular embodiments, social graph 200 may include multiple nodes—which may include multiple user nodes 202 or multiple concept nodes 204—and multiple edges 206 connecting the nodes. Example social graph 200 illustrated in FIG. 2 is shown, for didactic purposes, in a two-dimensional visual map representation. In particular embodiments, a social-networking system 160, client system 130, or third-party system 170 may access social graph 200 and related social-graph information for suitable applications. The nodes and edges of social graph 200 may be stored as data objects, for example, in a data store (such as a social-graph database). Such a data store may include one or more searchable or queryable indexes of nodes or edges of social graph 200.

In particular embodiments, a user node 202 may correspond to a user of social-networking system 160. As an example and not by way of limitation, a user may be an individual (human user), an entity (e.g., an enterprise, business, or third-party application), or a group (e.g., of individuals or entities) that interacts or communicates with or over social-networking system 160. In particular embodiments, when a user registers for an account with social-networking system 160, social-networking system 160 may create a user node 202 corresponding to the user, and store the user node 202 in one or more data stores. Users and user nodes 202 described herein may, where appropriate, refer to registered users and user nodes 202 associated with registered users. In addition or as an alternative, users and user nodes 202 described herein may, where appropriate, refer to users that have not registered with social-networking system 160. In particular embodiments, a user node 202 may be associated with information provided by a user or information gathered by various systems, including social-networking system 160. As an example and not by way of limitation, a user may provide his or her name, profile picture, contact information, birth date, sex, marital status, family status, employment, education background, preferences, interests, or other demographic information. In particular embodiments, a user node 202 may be associated with one or more data objects corresponding to information associated with a user. In particular embodiments, a user node 202 may correspond to one or more webpages.

In particular embodiments, a concept node 204 may correspond to a concept. As an example and not by way of limitation, a concept may correspond to a place (such as, for example, a movie theater, restaurant, landmark, or city); a website (such as, for example, a website associated with social-network system 160 or a third-party website associated with a web-application server); an entity (such as, for example, a person, business, group, sports team, or celebrity); a resource (such as, for example, an audio file, video file, digital photo, text file, structured document, or application) which may be located within social-networking system 160 or on an external server, such as a web-application server; real or intellectual property (such as, for example, a sculpture, painting, movie, game, song, idea, photograph, or written work); a game; an activity; an idea or theory; another suitable concept; or two or more such concepts. A concept node 204 may be associated with information of a concept provided by a user or information gathered by various systems, including social-networking system 160. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 204 may be associated with one or more data objects corresponding to information associated with concept node 204. In particular embodiments, a concept node 204 may correspond to one or more webpages.

In particular embodiments, a node in social graph 200 may represent or be represented by a webpage (which may be referred to as a "profile page"). Profile pages may be hosted by or accessible to social-networking system 160. Profile pages may also be hosted on third-party websites associated with a third-party server 170. As an example and not by way of limitation, a profile page corresponding to a particular external webpage may be the particular external webpage and the profile page may correspond to a particular concept node 204. Profile pages may be viewable by all or a selected subset of other users. As an example and not by way of limitation, a user node 202 may have a corresponding user-profile page in which the corresponding user may add content, make declarations, or otherwise express himself or herself. As another example and not by way of limitation, a concept node 204 may have a corresponding concept-profile page in which one or more users may add content, make declarations, or express themselves, particularly in relation to the concept corresponding to concept node 204.

In particular embodiments, a concept node 204 may represent a third-party webpage or resource hosted by a third-party system 170. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check in," "eat," "recommend," or another suitable action or activity. A user viewing the third-party webpage may perform an action by selecting one of the icons (e.g., "eat"), causing a client system 130 to send to social-networking system 160 a message indicating the user's action. In response to the message, social-networking system 160 may create an edge (e.g., an "eat" edge) between a user node 202 corresponding to the user and a concept node 204 corresponding to the third-party webpage or resource and store edge 206 in one or more data stores.

In particular embodiments, a pair of nodes in social graph 200 may be connected to each other by one or more edges 206. An edge 206 connecting a pair of nodes may represent a relationship between the pair of nodes. In particular embodiments, an edge 206 may include or represent one or more data objects or attributes corresponding to the relationship between a pair of nodes. As an example and not by way of limitation, a first user may indicate that a second user is a "friend" of the first user. In response to this indication, social-networking system 160 may send a "friend request" to the second user. If the second user confirms the "friend request," social-networking system 160 may create an edge 206 connecting the first user's user node 202 to the second user's user node 202 in social graph 200 and store edge 206 as social-graph information in one or more data stores 164. In the example of FIG. 2, social graph 200 includes an edge 206 indicating a friend relation between user nodes 202 of user "A" and user "B" and an edge indicating a friend relation between user nodes 202 of user "C" and user "B." Although this disclosure describes or illustrates particular edges 206 with particular attributes connecting particular user nodes 202, this disclosure contemplates any suitable edges 206 with any suitable attributes connecting user nodes 202. As an example and not by way of limitation, an edge 206 may represent a friendship, family relationship, business or employment relationship, fan relationship, follower relationship, visitor relationship, subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 200 by one or more edges 206.

In particular embodiments, an edge 206 between a user node 202 and a concept node 204 may represent a particular action or activity performed by a user associated with user node 202 toward a concept associated with a concept node 204. As an example and not by way of limitation, as illustrated in FIG. 2, a user may "like," "attended," "played," "listened," "cooked," "worked at," or "watched" a concept, each of which may correspond to a edge type or subtype. A concept-profile page corresponding to a concept node 204 may include, for example, a selectable "check in" icon (such as, for example, a clickable "check in" icon) or a selectable "add to favorites" icon. Similarly, after a user clicks these icons, social-networking system 160 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 160 may create a "listened" edge 206 and a "used" edge (as illustrated in FIG. 2) between user nodes 202 corresponding to the user and concept nodes 204 corresponding to the song and application to indicate that the user listened to the song and used the application. Moreover, social-networking system 160 may create a "played" edge 206 (as illustrated in FIG. 2) between concept nodes 204 corresponding to the song and the application to indicate that the particular song was played by the particular application. In this case, "played" edge 206 corresponds to an action performed by an external application (SPOTIFY) on an external audio file (the song "Imagine"). Although this disclosure describes particular edges 206 with particular attributes connecting user nodes 202 and concept nodes 204, this disclosure contemplates any suitable edges 206 with any suitable attributes connecting user nodes 202 and concept nodes 204. Moreover, although this disclosure describes edges between a user node 202 and a concept node 204 representing a single relationship, this disclosure contemplates edges between a user node 202 and a concept node 204 representing one or more relationships. As an example and not by way of limitation, an edge 206 may represent both that a user likes and has used at a particular concept. Alternatively, another edge 206 may represent each type of relationship (or multiples of a single relationship) between a user node 202 and a concept node 204 (as illustrated in FIG. 2 between user node 202 for user "E" and concept node 204 for "SPOTIFY").

In particular embodiments, social-networking system 160 may create an edge 206 between a user node 202 and a concept node 204 in social graph 200. As an example and not by way of limitation, a user viewing a concept-profile page (such as, for example, by using a web browser or a special-purpose application hosted by the user's client system 130) may indicate that he or she likes the concept represented by the concept node 204 by clicking or selecting a "Like" icon, which may cause the user's client system 130 to send to social-networking system 160 a message indicating the user's liking of the concept associated with the concept-profile page. In response to the message, social-networking system 160 may create an edge 206 between user node 202 associated with the user and concept node 204, as illustrated by "like" edge 206 between the user and concept node 204. In particular embodiments, social-networking system 160 may store an edge 206 in one or more data stores. In particular embodiments, an edge 206 may be automatically formed by social-networking system 160 in response to a particular user action. As an example and not by way of limitation, if a first user uploads a picture, watches a movie, or listens to a song, an edge 206 may be formed between user node 202 corresponding to the first user and concept nodes 204 corresponding to those concepts. Although this disclosure describes forming particular edges 206 in particular manners, this disclosure contemplates forming any suitable edges 206 in any suitable manner.

In particular embodiments, an advertisement may be text (which may be HTML-linked), one or more images (which may be HTML-linked), one or more videos, audio, one or more ADOBE FLASH files, a suitable combination of these, or any other suitable advertisement in any suitable digital format presented on one or more webpages, in one or more e-mails, or in connection with search results requested by a user. In addition or as an alternative, an advertisement may be one or more sponsored stories (e.g., a news-feed or ticker item on social-networking system 160). A sponsored story may be a social action by a user (such as "liking" a page, "liking" or commenting on a post on a page, RSVPing to an event associated with a page, voting on a question posted on a page, checking in to a place, using an application or playing a game, or "liking" or sharing a website) that an advertiser promotes, for example, by having the social action presented within a pre-determined area of a profile page of a user or other page, presented with additional information associated with the advertiser, bumped up or otherwise highlighted within news feeds or tickers of other users, or otherwise promoted. The advertiser may pay to have the social action promoted. As an example and not by way of limitation, advertisements may be included among the search results of a search-results page, where sponsored content is promoted over non-sponsored content.

In particular embodiments, an advertisement may be requested for display within social-networking-system webpages, third-party webpages, or other pages. An advertisement may be displayed in a dedicated portion of a page, such as in a banner area at the top of the page, in a column at the side of the page, in a GUI of the page, in a pop-up window, in a drop-down menu, in an input field of the page, over the top of content of the page, or elsewhere with respect to the page. In addition or as an alternative, an advertisement may be displayed within an application. An advertisement may be displayed within dedicated pages, requiring the user to interact with or watch the advertisement before the user may access a page or utilize an application. The user may, for example, view the advertisement through a web browser.

A user may interact with an advertisement in any suitable manner. The user may click or otherwise select the advertisement. By selecting the advertisement, the user may be directed to (or a browser or other application being used by the user) a page associated with the advertisement. At the page associated with the advertisement, the user may take additional actions, such as purchasing a product or service associated with the advertisement, receiving information associated with the advertisement, or subscribing to a newsletter associated with the advertisement. An advertisement with audio or video may be played by selecting a component of the advertisement (like a "play button"). Alternatively, by selecting the advertisement, social-networking system 160 may execute or modify a particular action of the user.

An advertisement may also include social-networking-system functionality that a user may interact with. As an example and not by way of limitation, an advertisement may enable a user to "like" or otherwise endorse the advertisement by selecting an icon or link associated with endorsement. As another example and not by way of limitation, an advertisement may enable a user to search (e.g., by executing a query) for content related to the advertiser. Similarly, a user may share the advertisement with another user (e.g., through social-networking system 160) or RSVP (e.g., through social-networking system 160) to an event associated with the advertisement. In addition or as an alternative, an advertisement may include social-networking-system context directed to the user. As an example and not by way of limitation, an advertisement may display information about a friend of the user within social-networking system 160 who has taken an action associated with the subject matter of the advertisement.

In particular embodiments, social-networking system 160 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 170 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 160 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part a the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 160 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 160 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 160 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 160 may calculate a coefficient based on a user's actions. Social-networking system 160 may monitor such actions on the online social network, on a third-party system 170, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 160 may calculate a coefficient based on the user's actions with particular types of content. The content may be associated with the online social network, a third-party system 170, or another suitable system. The content may include users, profile pages, posts, news stories, headlines, instant messages, chat room conversations, emails, advertisements, pictures, video, music, other suitable objects, or any combination thereof. Social-networking system 160 may analyze a user's actions to determine whether one or more of the actions indicate an affinity for subject matter, content, other users, and so forth. As an example and not by way of limitation, if a user may make frequently posts content related to "coffee" or variants thereof, social-networking system 160 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 160 may calculate a coefficient based on the type of relationship between particular objects. Referencing the social graph 200, social-networking system 160 may analyze the number and/or type of edges 206 connecting particular user nodes 202 and concept nodes 204 when calculating a coefficient. As an example and not by way of limitation, user nodes 202 that are connected by a spouse-type edge (representing that the two users are married) may be assigned a higher coefficient than a user nodes 202 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in first photo, but merely likes a second photo, social-networking system 160 may determine that the user has a higher coefficient with respect to the first photo than the second photo because having a tagged-in-type relationship with content may be assigned a higher weight and/or rating than having a like-type relationship with content. In particular embodiments, social-networking system 160 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 160 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 200. As an example and not by way of limitation, social-graph entities that are closer in the social graph 200

(i.e., fewer degrees of separation) may have a higher coefficient than entities that are further apart in the social graph 200.

In particular embodiments, social-networking system 160 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 130 of the user). A first user may be more interested in other users or concepts that are closer to the first user. As an example and not by way of limitation, if a user is one mile from an airport and two miles from a gas station, social-networking system 160 may determine that the user has a higher coefficient for the airport than the gas station based on the proximity of the airport to the user.

In particular embodiments, social-networking system 160 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 160 may provide information that is relevant to user's interests and current circumstances, increasing the likelihood that they will find such information of interest. In particular embodiments, social-networking system 160 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 160 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 160 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 170 (e.g., via an API or other communication channel), or from another suitable system. In response to the request, social-networking system 160 may calculate the coefficient (or access the coefficient information if it has previously been calculated and stored). In particular embodiments, social-networking system 160 may measure an affinity with respect to a particular process. Different processes (both internal and external to the online social network) may request a coefficient for a particular object or set of objects. Social-networking system 160 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, field 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 204 corresponding to a particular photo may have a privacy setting specifying that the photo may only be accessed by users tagged in the photo and their friends. In particular embodiments, privacy settings may allow users to opt in or opt out of having their actions logged by social-networking system 160 or shared with other systems (e.g., third-party system 170). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 170, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 162 may be authorization/privacy servers for enforcing privacy settings. In response to a request from a user (or other entity) for a particular object stored in a data store 164, social-networking system 160 may send a request to the data store 164 for the object. The request may identify the user associated with the request and may only be sent to the user (or a client system 130 of the user) if the authorization server determines that the user is authorized to access the object based on the privacy settings associated with the object. If the requesting user is not authorized to access the object, the authorization server may prevent the requested object from being retrieved from the data store 164, or may prevent the requested object from be sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 3A:
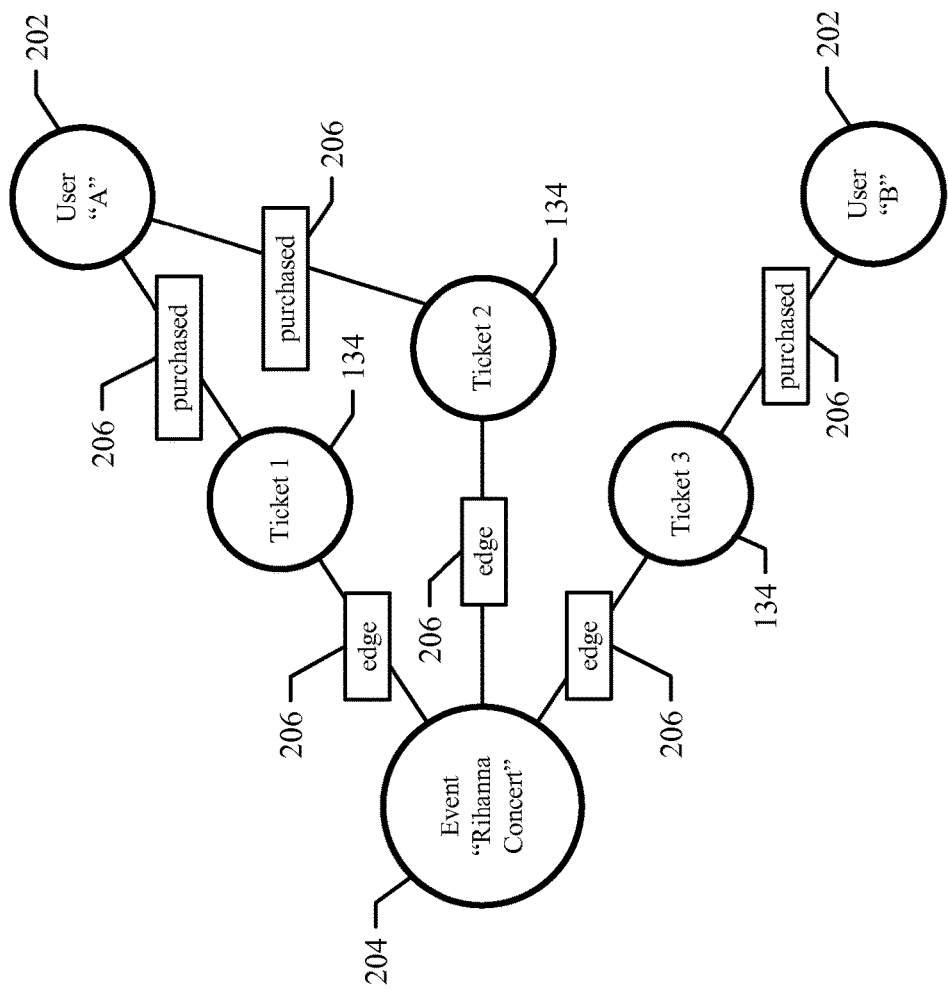
FIG. 3A illustrates an example social graph with event and ticket nodes.

FIG. 3A illustrates an example social graph 300 with event ticketing nodes. Social-networking system users may organize events for which a specified number of tickets may be sold to other users of the social-networking system. A user who organizes an event is referred to herein as an event organizer. An event may be a concert, theater performance, sports game, trade show, or other social event. An event organizer may add information about the event, such as an event page, to the social network. Other users may then access the event information, e.g., on the event page, to find details about and purchase tickets to the event. The event information may include details about the event, such as a description, location, date, time, and the like. The event information may be stored in an event node, which represents the event and, together with graph edges, represents the event's relationships to other entities, such as users, places, and the like, in a social graph.

In particular embodiments, event organizers may request that tickets for events be made available to other social network users by requesting that a desired number of tickets be reserved. The tickets may be made available to a specified set of other social network users for purchase. For example, tickets may be made available only to users who are directly or indirectly connected to the event organizer, such as friends, or friends of friends, of the organizer. As another example, the tickets may be made available to users who like or are otherwise connected to an entity associated with the event, such as a musician who will be performing at the event. As yet another example, the tickets may be made available to any users of the social network, without restriction. In other examples, other conditions based on information stored in the social graph may be used to determine which users are permitted to receive the tickets and which users are not. In particular embodiments, since event organizers are social network users, event organizers may purchase or acquire tickets for events organized by other users.

In particular embodiments, event tickets purchased by user of the social-networking systems may be redeemed to gain admission to the event. For example, a machine-readable representation of the ticket, such as a QR code, may be generated and provided to the user, and the user may present the representation of the ticket for scanning by a ticket scanner to gain admission to the actual event. A ticket may include an image of a coded hash value (e.g., a QR code) based on, by way of example and not limitation, a hash of the user's social network user identifier and the ticket identifier. The image may be presented for redemption at an associated event, e.g., printed on paper, displayed on a mobile device screen, and so on. In another example, the identity of a user of the social-networking system who wishes to attend an event may be authenticated when the ticket is redeemed. A successfully authenticated user may be admitted to the event if a ticket for the event is associated with the authenticated user in the social network.

Referring to FIG. 3A, the example social graph 300 includes user nodes 202, which correspond to users of the social network. An event node 204, which represents an event named "Rihanna Concert", has been created in response to an event organizer 192 requesting creation of the event in the social-networking system 162. Details about the event, such as an event identifier, venue identifier, location, data, time, and number of available tickets or seats may be stored in the social-networking system in association with the event node 204 (e.g., as attributes of event node 204). The details may correspond to event data stored in the third-party system 170—such details may have been provided by the third-party server 170 and/or other data sources. The event details may be received from the event organizer 192, retrieved from other nodes of the social graph that are related to the event or venue, or received from other sources. The event node 204 may be created by the event creation method of FIG. 4A. Three ticket nodes 310, labeled Ticket 1, Ticket 2, and Ticket 3, may correspond to three different tickets 134 for the event, named Ticket 1, Ticket 2, and Ticket 3. The three ticket nodes 310 may be connected to the event node 204 by edges 206. Each ticket node 310 may include ticket details, such as a seat number, seat tier identifier (e.g., General Admission, VIP, Premium), face value, sale price, and state information such as a Boolean flag indicating whether the ticket has been redeemed. Tickets may be valid for one event having a date, time, venue, and event name. Specific tickets may have attributes that override the event's attributes, such as a range or list of multiple valid dates.

A ticket node 310 may be connected by an edge to a user node 202 to represent the assignment of a ticket 134 corresponding to the ticket node 310 to a user corresponding to the user node 202. The connections between ticket nodes 310 ("Ticket 1" and "Ticket 2") and the user A node 202 may be created when those two tickets are assigned to user A, e.g., at the time of purchase. Since those two ticket nodes 310 are also connected to the event node 204, user A may redeem Ticket 1 and Ticket 2 to admit two people to the "Rihanna Concert" event. A third ticket node 310, which corresponds to Ticket 3, is connected to the user "B" node 202 and to the event node 204. Therefore, user "B" can use Ticket 3 to admit one person to the "Rihanna Concert" event. Note that the social graph 300 may be a portion of a larger social graph, such as the social graph 200 of FIG. 2.

In particular embodiments, when a user purchases a ticket, the ticket node that corresponds to the ticket is connected to the user node that corresponds to the user. Each ticket node may also be connected to an event node that corresponds to the event associated with the ticket. Tickets may be transferred between two users by eliminating the edge between the ticket node and the user node for the transferor and creating an edge between the ticket node and the user node for the transferee.

In particular embodiments, when ticketholder attempts to redeem a ticket 134, the validity of the ticket may be verified by scanning a graphical code image presented by the person redeeming the ticket. The code image may be generated when the ticket is purchased (or transferred) by applying a one-way hash function to a combination of a user identifier for the purchasing user and the ticket identifier of the purchased ticket. The code image may be provided to the purchasing user with the ticket, e.g., on a graphical image of the ticket. A ticket scanner may be used to scan the code image presented by a redeeming user, and the hash value encoded in the presented image may be used to look up a combination of a user node and a ticket node. If the user node is connected to the ticket node in the social graph of the social-networking system, then the redeeming user may be deemed to be the actual ticketholder (assuming that the redeeming user's identity has been verified to match profile information associated with the user node). The ticket is therefore considered valid, and the user presenting the ticket may be admitted to the event.

Figure 3B:
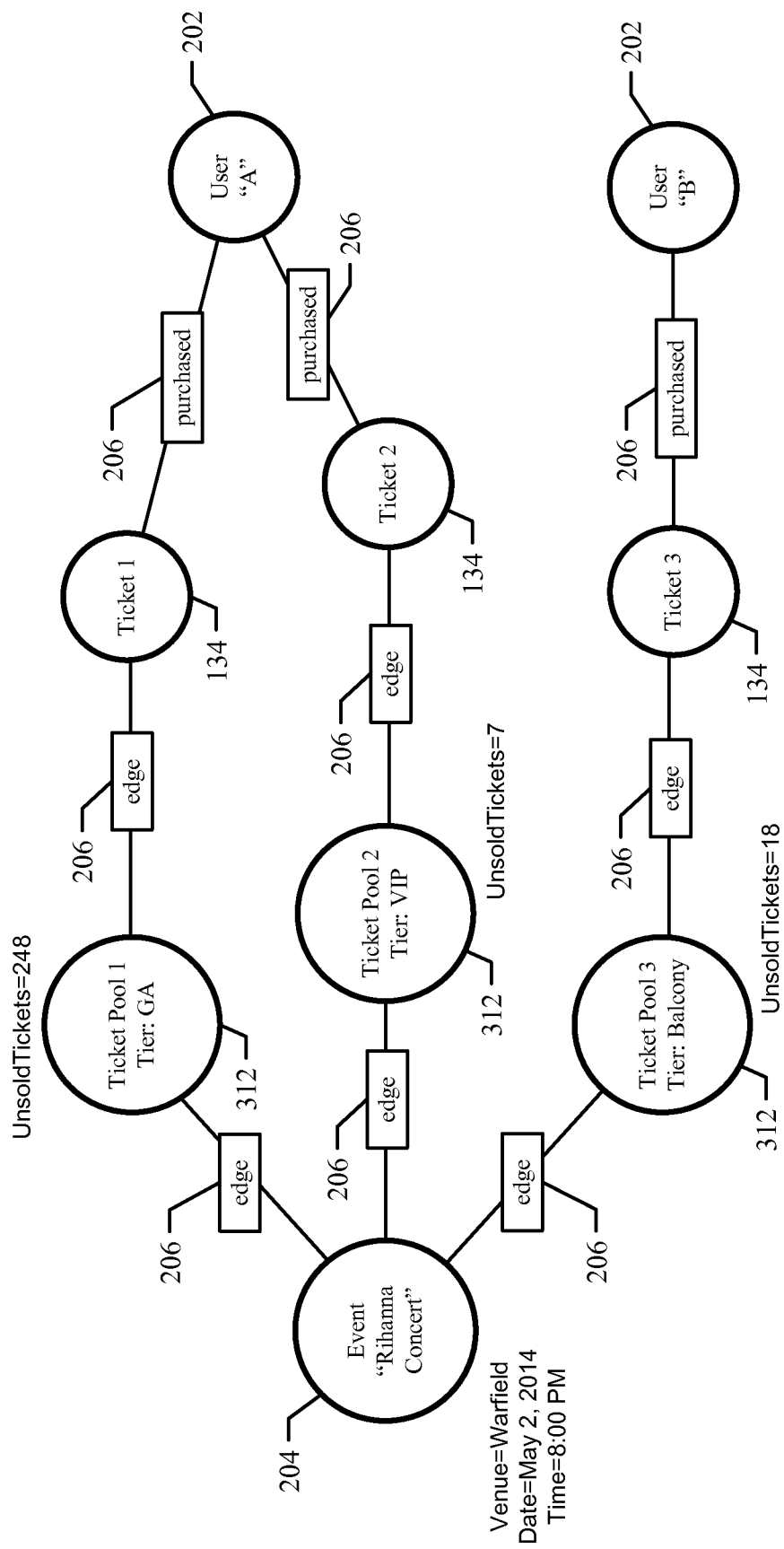
FIG. 3B illustrates example an social graph with event and ticket nodes, including ticket pool nodes.

FIG. 3B illustrates an example social graph 320 with event ticketing nodes, including ticket pool nodes. A ticket pool may represent a set of one or more tickets. The tickets in the pool may share a common characteristic, such as a tier (e.g., General Admission, VIP, or the like), price, and so on. A ticket pool may be represented by a ticket pool node 312 connected to the ticket nodes 310 that correspond to the tickets in the pool. The pool may be associated with a price class having additional features, such as backstage access associated with a VIP tier. The ticket pool node 312 may also include additional details, such as the total number of tickets in the pool, the number of unsold tickets in the pool, the price of each ticket in the tier, and other information. Each ticket pool node 312 is connected to an event node 204, and further connected to the ticket node 310 of each ticket in the tier. Each ticket node 310 may be connected to a user node 202 to indicate that a user, who corresponds to the user node 202, holds the corresponding ticket, or to no user nodes if no users hold the corresponding ticket.

In FIG. 3B, a "Rihanna Concert" event node 204 is connected to a General Admission (GA) ticket pool node 312, a VIP ticket pool node 312, and a Balcony ticket pool node 312. A ticket node 310 that corresponds to Ticket 1 is connected to the GA pool node 312, which indicates that Ticket 1 is in the GA tier, and to the user "A" node 202. The latter connection indicates that Ticket 1 is held by user "A". Since the Ticket 1 ticket node 310 is connected to the GA pool node 312 and to the user "A" node 202, Ticket 1 can be used to admit user "A" to the GA tier of the "Rihanna Concert" event. Similarly, since the Ticket 2 ticket node 310 is connected to the VIP pool node 312 and to the user "A" node 202, Ticket 2 can be used to admit user "A" to the VIP tier of the "Rihanna Concert" event. Further, since the Ticket 3 ticket node 310 is connected to the Balcony pool node 312 and to the user "B" node 202, Ticket 3, can be used to admit user "B" to the VIP tier of the "Rihanna Concert" event.

In particular embodiments, events and tickets 134 in the social-networking system may be associated with corresponding third-party event and ticket information stored on one or more third-party servers. The social-networking system may obtain at least a portion of the event and/or ticket information, such as venue details, seating availability, ticket prices, and/or other relevant information from a third-party server via a computer network. If the social-networking system updates event or ticket information stored on the third-party server, the social networking system may send the updated event information to the third-party server. The third-party servers may be operated by, for example, venues in which events are held, organizations that sell tickets on behalf of performers or venues, or the like. The third-party servers can perform portions of the event processing, such as transaction fulfillment when tickets are purchased, or the like.

In particular embodiments, the social-networking system's representation of events, ticket pools, and individual tickets 134 as nodes in the social graph may provide protection against fraud. A node that represents an event may be connected directly to a ticket node that represents a ticket for the event. The node representing the event may alternatively be connected to node representing a ticket pool, where the ticket pool may include a certain tier of tickets (e.g., GA, VIP, etc.). The ticket pool node is connected to individual ticket nodes that represent the individual tickets in the pool. In one example, when a ticket is sold to a user of the social-networking system, an edge is created between the corresponding ticket node and the corresponding user node.

In one or more embodiments, users may redeem tickets 134 to gain access to, e.g., attend, participate in, view, receive information from, or otherwise obtain permission for an event. Ordinarily, at the time and/or place of the event, a person or device checks validity of tickets presented by users who wish to gain access to the event, and allows access only to users who present valid tickets. The person or device who checks the validity of tickets is referred to herein as a "ticket validator" and may be an operator of a ticket validation device 180 such as a desktop computer, mobile device, or scanning device at the point of redemption. The ticket validator may alternatively be an automated scanner that operates without human assistance, or other device that can check ticket validity and control access to the event.

In one example, an event may occur once, at a specific date and time, and a ticket associated with an event that occurs on a specific date and time is only valid for the event at the event's date and time. An event may occur at multiple dates and times, in which case the associated ticket may be valid for any one occurrence of the event, or for a multiple occurrences of the event (e.g., a season pass). For example, the event and/or ticket may be associated with a range of valid dates, during which the ticket can be used to gain access to any number of occurrences of the event. Further, a ticket 134 may ordinarily only be valid for the user with whom it is associated, although tickets may be transferred between users.

In one or more embodiments, a ticket 134 for an event is valid when a user node that corresponds to the user presenting the ticket is connected to a ticket node that corresponds to the ticket, and the ticket node that corresponds to the ticket is connected to an event node that corresponds to the event. Therefore, the determination of whether a ticket is valid is ordinarily based on the redeeming user's user node, the ticket node, and the event node. These nodes may be identified at the point of redemption and used to validate the ticket various ways, e.g., using a ticket scanner, identifying the user by an authentication process, receiving the respective node identifiers from the user and/or ticket validator. Such techniques for determining whether a ticket is valid are described below.

In particular embodiments, the ticket provided to the user may have an image of a QR code that contains a hash value based on a user identifier and a ticket identifier, which identify the user node and the ticket node, respectively. The social-networking system may identify the user node and the ticket node in the social graph. In particular embodiments, the ticket received by users may include scannable codes, such as QR codes, and the redeeming user may present the ticket's scannable code at the point of redemption, e.g., on a paper printout, mobile device display, or other suitable medium. The redeeming user may not need to be authenticated if the ticket code displayed using an application requiring user authentication (e.g., a login and password entered by the user to log in to the application or to retrieve the ticket code). A scanner device, such as the ticket scanner 110 of FIG. 11, may be used by venue staff (or other ticket validator) to scan the ticket code 136 on the ticket 134 (e.g., scan a string of characters or an image encoding ticket code 136, such as a QR code or a bar code) and determine whether the ticket code corresponds to an expected code for the redeeming user based on ticket node connectivity in the social graph at the time of redemption. A ticket code may be generated and associated with a ticket when, for example, a user acquires (e.g., purchases) the ticket. The ticket code (also referred to as a "first" code) may generated by applying a hash function, such as MD5, SHA1, or the like, to a combination of a user node identifier and a ticket identifier. For example:

ticket code=hash(acquiring user identifier+acquired ticket's ticket identifier).

The user and ticket identifiers may be values that uniquely identify the user and ticket, respectively, and may be based on the respective user node identifier and ticket node identifier from the social graph. The ticket code may then be used to generate a machine-readable code image, such as a QR code, which can be associated with the ticket, displayed, and scanned, as described above. When the user presents a ticket code image at a point of redemption, the social-networking system may determine whether the presented ticket code is valid. In particular embodiments, if the user can successfully authenticate to the social network at the time of redemption, e.g., by logging in or otherwise presenting identification credentials, then the user's authenticated identity may be used to determine whether the user has a valid ticket for the event by querying the social graph. The user's identification credentials can be used to identify the user node. The event node can be identified based on input from a ticket validator's computing device (e.g., a desktop computer, mobile device, or scanning device) at the point of redemption. The social-networking system may then determine whether the ticket is valid by identifying a ticket node corresponding to the ticket identifier. If such a ticket node exists and is valid (e.g., indicates that the ticket has not been redeemed yet), then the ticket is valid. In particular embodiments, a user who has successfully authenticated (e.g., logged in) to the social-networking system may not need to present a ticket, because the social graph can be queried to determine if the user has a valid ticket to the event. The user node that corresponds to the user may be identified when the user logs into the social-networking system, and the event node that corresponds to the event may be identified based on the event's identifier or other information received from the user and/or ticket validator at the point of redemption, such as the event's name, location date, and the like. The ticket node may not have been identified by the user, but each ticket node connected to the user node and also connected to the event node may be checked for validity until a valid ticket is found, in which case the user will be deemed to have a valid ticket, or until every one of the tickets are found to be invalid, in which case the user does not have a valid ticket.

In particular embodiments, tickets can be checked for validity by receiving information that identifies the user node, ticket node, and/or event node as input from the user and/or ticket validator. For example, the ticket validator may enter the user identifier and event identifier into a validation device as alphanumeric values, and the ticket validator may submit the user and event identifiers to the social-networking system. The user may optionally be authenticated by the validation device, e.g., to prevent use of the ticket by people other than the user associated with the ticket node. The social-networking system identifies the user node and ticket node that correspond to the user identifier and event identifier, respectively. To identify the user node, the social-networking system may authenticate the requesting user's identity and determine an identifier for the requesting user node. The requesting user node may be associated with information corresponding to the identity of the requesting user. The information corresponding to the identity of the requesting user may include one or more of a social-networking user identifier, an email address, a telephone number, a driver's license number, a credit card number, a mobile device identifier, or biometric identification information. The social-networking system may then determine whether there is a valid ticket node connected to the event node and user node in the social graph. If so, the ticket is valid. In other embodiments, other information may be received from the redeeming user and/or ticket validator and used to identify one or more of the user node, ticket node, or event node and determine whether the ticket is valid. For example, the redeeming user may present a ticket code comprising a hash of a ticket node identifier and a user node identifier. The ticket redemption process of FIG. 7 may then be used to determine whether the ticket is valid by using the ticket code to look up the ticket node identifier and the user node identifier in a table.

In particular embodiments, two nodes are said to be directly connected when there is an edge in the social graph between the two nodes. Two nodes are said to be indirectly connected when there is a path of nodes between the two nodes, and the nodes in the path are linked together. For example, as described with reference to FIG. 3, a ticket node may be connected to a corresponding event node via a ticket pool node 312.

In particular embodiments, problems such as inconsistency and unreliability in ticket redemption that may occur in online ticket transaction processing may be prevented, because tickets 134 may be redeemed based on up-to-date information about the users associated with the tickets in the social graph. For example, tickets may be securely transferred between user of the social-networking systems while preventing two different users from redeeming a single ticket.

In particular embodiments, a ticket may be invalidated by disconnecting the corresponding ticket node from the event node or user node in the social graph. Two nodes may be disconnected by removing the edge that connects them from the social graph. A new ticket code image (e.g., a QR code) may be generated when a ticket is transferred to a different user. The new ticket code image may be sent to the user who receives the ticket, and the previous ticket code image, which is known to the selling user, is no longer valid because the user ID encoded in the previous barcode no longer matches the user ID associated with the ticket in the social graph. Note that invalidating ticket codes in other systems that use third-party codes or transaction processors is difficult, and problems such as incomplete transactions can occur when tickets are transferred between people in such systems.

In particular embodiments, ticket prices and/or availability may be established based on social-graph information, such as a degree of closeness or affinities between the selling entity or user, the purchasing user and other users, the event, and/or concept nodes related to the event. The ticket prices and/or availability may be determined at the time of purchase, and displayed on, for example, the event page or ticket purchasing user interface. In one example, the ticket price may be low or zero if the purchaser is a first-degree friend of the seller, and the price may increase as the degree of separation between the seller and purchaser in the social graph increases. The initial price of the ticket, e.g., the price set by the event organizer or a user selling the ticket, may be public, but if a user who is a close friend of the seller requests the ticket, the ticket may be transferred at a lower price than the initial price. An auction may also be used to establish the price, with different prices for different users based on the degree of separation of the users from the seller. Other measures of the degree of closeness may be used, e.g., social graph affinity, frequency or amount of communication, and so on, to determine the ticket price.

In particular embodiments, information in the social graph may be used to determine the availability and/or prices of tickets. A user's interactions with entities related to the event, such as a person or group performing at the event, may influence the price and/or availability of the ticket. For example, if a user has liked the social network page for a band performing at the event, then the user may receive a discount that lowers the ticket price or other reward. The affinity coefficient or loyalty of the user may also influence the price of the ticket. For example, a user who has shared information about the band or has higher affinity for the band may receive a discount. Users who are trendsetters may also receive discounts. Communications between users, e.g., chatting about a particular band, may establish affinity between users and the band. Users who are in a particular demographic may also receive discounts.

In one or more embodiments, advertisements may be targeted to users based on ticket purchasing information and other information stored in the social graph. For example, if several of a user's friends have tickets to an event, then the user is also likely to attend to that event. Advertisement may be targeted to users have tickets for an event, and friends of the users who have tickets for the event. There may be policy-based restrictions that prevent advertising to user' friends. Location-based targeting may be used to sell tickets for events that are occurring in the near future, e.g., within the next hour. For example, an event organizer who has unsold ticket inventory may want to sell tickets at a reduced price to users located within one block for the next 15 minutes. The location-based targeting uses the social-network's information about users' locations in real time.

Existing advertisement platforms ordinarily charge for advertisements per click. In particular embodiments, instead of charging per-click, event hosts can be charged for advertisements by the number of tickets they sell. Reengagement advertisements may be targeted to users who attended an event that occurred in the past, such as users who attended an event last year. Reengagement advertisements may also be targeted to users who have currently-valid tickets for the same event. For example, advertisements may be targeted to users who purchased tickets to an event to advertise other services to the users, such as VIP tickets, prepaid concessions, parking tickets, and the like. If an event is recurring, purchasers can be shown advertisements for future occurrences of the event. For example, a user who buys a Giants ticket on Facebook may be shown an advertisement for the next week's Giants game.

Figure 4A:
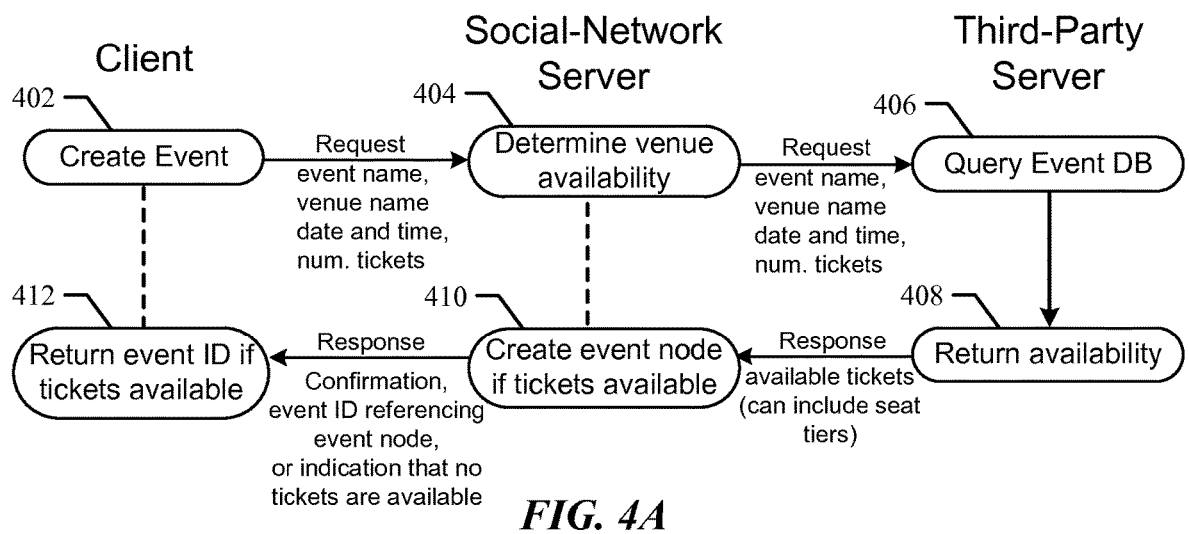
FIG. 4A illustrates an example method for creating events in a social-networking system.

FIG. 4A illustrates an example method 400 for creating events in a social-networking system. In particular embodiments, the method 400 may create an event node for and return information about an existing actual event, about which information already exists in the third-party server, and for which a number of tickets may already have been sold. The social-networking system may keep track of how many tickets are available and how many have been sold. In particular embodiments, tickets that are for sale via the social-networking system may not be available anywhere else. Once a ticket has been sold, it is no longer available for purchase from its original seller, but may be purchased from its current owner.

The method 400 may begin at step 402, where a user of social-networking system 160, such as an event organizer 192, may use a client application or browser to request creation of a representation of an event in the social-networking system 160. A request to create an event is then sent from the user's client system 130 to the social-network server 162. Requests may be sent as messages or other forms of data via the network 110. The request may include the event name, venue name, date and time of the event, and number of tickets that are expected to be needed. At step 404, the social-network server 162 may receive the request and, in response, determine availability of tickets at the venue. To determine venue availability, the social-network server 162 sends a request to a third-party server 170 that maintains event and venue information, including ticket availability information. This request may include the same information as the aforementioned request from the client 130 to the social-network server 162.

At step 406, the transaction processor 172 queries the event database 174 to determine whether the venue is available for the requested event. The results of the query indicate whether the requested number of tickets are available for the event. The results may also indicate the tiers in which the seats are located. The query results are returned to the social-network server 162 in a response. At step 410, the social-network server 162 may receive the ticket availability information. If tickets are available, the social-network server 162 may create an event node, and store the received ticket availability information (such as the number of available tickets) in the event node. The social-network server 162 may then send a response to the client 130. If tickets are available, the response confirms that the tickets are available, and that the representation of the event has been created. The response may also include an event identifier that references the newly-created event node. If the requested tickets are not available, then the response indicates that no event representation has been created because the tickets are not available, and no event identifier is available. At step 412, the client 130 may receive the response and, if the response confirms that the tickets are available, return the event identifier, e.g., for subsequent use in referring to the event. If the response indicates that the tickets are not available, then no event identifier is returned to the client application or browser at step 412, and the event organizer is informed that the event representation has not been created. Particular embodiments may repeat one or more steps of the method of FIG. 4A, where appropriate.

In particular embodiments, a user may control access to an event by distributing free tickets, which have a ticket price set to zero. For example, an event broker may be commissioned for selling tickets. The broker sells tickets using its social-network identity on the social-networking system.

Although this disclosure describes and illustrates particular steps of the method of FIG. 4A as occurring in a particular order, this disclosure contemplates any suitable steps of the method of FIG. 4A occurring in any suitable order. Moreover, although this disclosure describes and illustrates an example method for creating an event including the particular steps of the method of FIG. 4A, this disclosure contemplates any suitable method for creating an event including any suitable steps, which may include all, some, or none of the steps of the method of FIG. 4A, where appropriate. Furthermore, although this disclosure describes and illustrates particular components, devices, or systems carrying out particular steps of the method of FIG. 4A, this disclosure contemplates any suitable combination of any suitable components, devices, or systems carrying out any suitable steps of the method of FIG. 4A.

Figure 4B:
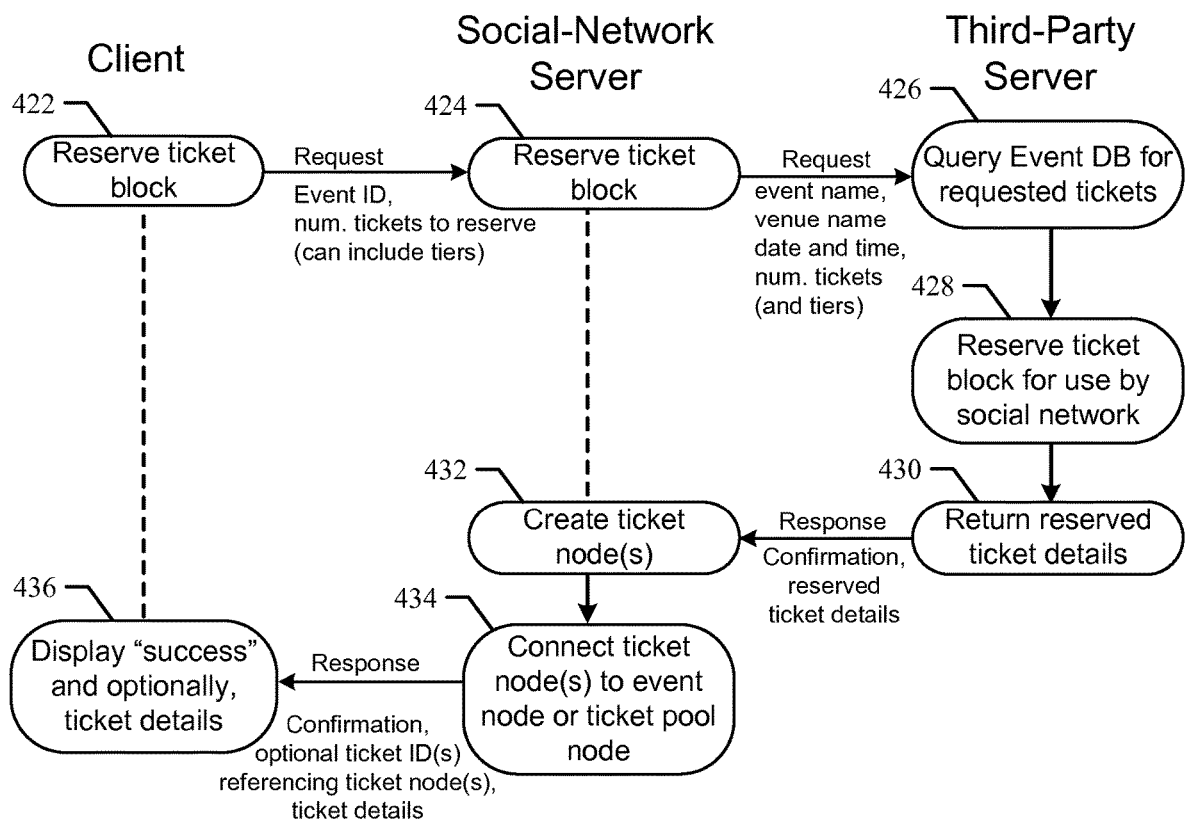
FIG. 4B illustrates an example method for reserving a block of tickets for use by a social-networking system.

FIG. 4B illustrates an example method 420 for reserving a block of tickets for use by a social-networking system 160. In particular embodiments, the block of tickets may be reserved for exclusive use by the social-networking system 160, in which case the third-party server 170, which distributes tickets, does not reserve or assign tickets to requesters who are not part of the social-networking system 160. To protect itself from impersonation or spoofing by other entities, the social-networking system may sign requests using a private key known only to the social-networking system 160. The third-party server 160 may verify the authenticity of the signed requests using a public key, and reserve and assign tickets only in response to requests that are properly signed by the social-networking system 160.

The method 420 may begin at step 422, where a user of a social-networking system 160, such as an event organizer 192, may use a client application or browser to request reservation of a block of tickets for an event. The reservation request specifies an event identifier, such as that returned by the method of FIG. 4A, referencing the event representation to which the block of tickets is to be added. A "Reserve Ticket Block" request is then sent from the user's client system 130 to the social-network server 162. The request may include the event identifier, the number of tickets to reserve, and, optionally, the tier(s) in which the tickets are to be reserved (e.g., the number of tickets to be reserved in each tier). The request may also include specific seat numbers to reserve. At step 424, the social-network server 162 may receive the request and, in response reserve the block of tickets by sending a request to the third-party server 170. The social-network server 162 may map the event identifier to an event name in a format understood by the third-party server 170 (e.g., a name previously stored in the event node), and send the event name, venue name, date and time, and number of requested tickets (per tier, if tiers are specified in the request received by the social-network server 162 at step 424).

At step 426, the third-party server may receive the request and query the event database 174 to determine whether the requested tickets are still available. If the tickets are not available, then an error is propagated back to the client 130, stating that the reservation could not be made. If the block of tickets is available, at step 428 the third-party server reserves the block of tickets for use by the social-networking system by executing a block reservation transaction, which updates the event database to indicate that the tickets have been reserved.

In particular embodiments, step 428 may reserve the tickets for exclusive use by the social-networking system 160, in which case the transaction processor 172 does not reserve or assign those reserved tickets for requests not from (e.g., not signed by) the social-networking system 160. Tickets in the block may be reserved for or assigned to requesters who are not part of the social-networking system 160, e.g., if the tickets have been released by the social-networking system 160, or have been transferred to a person who is not a member of the social-networking system 160. The block reservation transaction at step 428 may also assign specific tiers and seats to the tickets. Upon success of the block reservation transaction, the third-party server 170 may send a response confirming the block reservation with details about the reserved tickets to the social-network server 162 at step 430.

At step 432, the social-network server 162 may create a ticket node for each reserved ticket and store details about each ticket, such as the tier and seat (if applicable), in the corresponding ticket node. At step 434, the social-network server 162 may connect each newly-created ticket node to the event node. Alternatively, the social-network server 162 may connect each ticket node to a ticket pool node that corresponds to the tier of the ticket, which is in turn connected to the event node. If the ticket pool node does not exist, it may be created at step 434. The social-network server 162 may then send a response to the client 130 confirming the block reservation. The response may include the ticket identifiers and ticket details of the reserved tickets. At step 436, the client 130 may receive the confirmation and display the ticket details in the client application or web browser. Particular embodiments may repeat one or more steps of the method of FIG. 4B, where appropriate. Although this disclosure describes and illustrates particular steps of the method of FIG. 4B as occurring in a particular order, this disclosure contemplates any suitable steps of the method of FIG. 4B occurring in any suitable order. Moreover, although this disclosure describes and illustrates an example method for reserving a block of tickets including the particular steps of the method of FIG. 4B, this disclosure contemplates any suitable method for reserving tickets including any suitable steps, which may include all, some, or none of the steps of the method of FIG. 4B, where appropriate. Furthermore, although this disclosure describes and illustrates particular components, devices, or systems carrying out particular steps of the method of FIG. 4B, this disclosure contemplates any suitable combination of any suitable components, devices, or systems carrying out any suitable steps of the method of FIG. 4B.

Figure 5:
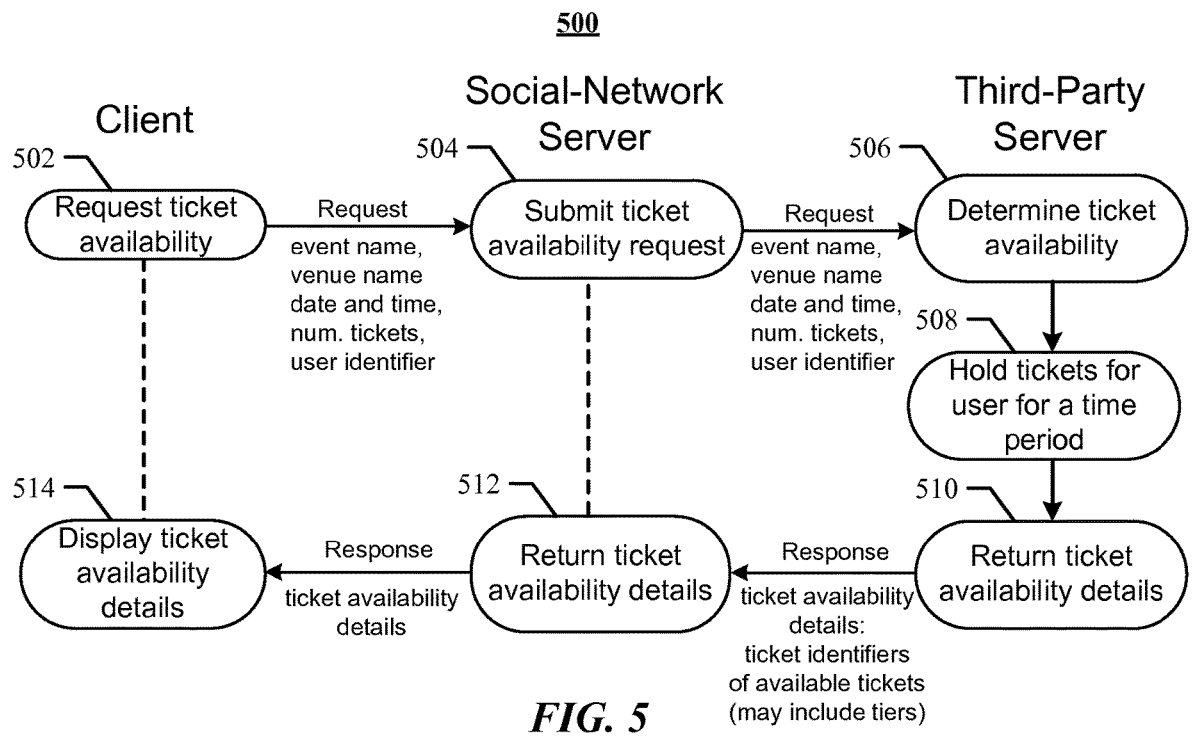
FIG. 5 illustrates an example method for requesting ticket availability in a social-networking system.

FIG. 5 illustrates an example method 500 for requesting ticket availability in a social-networking system. The method 500 may be used to determine whether a desired number of or set of tickets is available for purchase. Further, tickets for specific seat(s) and/or tier(s) may be requested, in which case the method 500 determines whether the specific seats and/or tiers are available. In one or more embodiments, the method 500 searches for tickets in a block of tickets previously reserved for exclusive use by the social-networking system 160, as described above with reference to FIG. 4B. If the desired tickets are available, the method 500 requests the third-party server to hold them for a short time period, such as 10 minutes or other period of time less than one hour. The tickets being held are not made available to other users for purchase during the holding time. If the requested tickets are available, the method 500 returns availability details, which may include a list of ticket identifiers that correspond to the available tickets. These ticket identifiers may then be passed to the ticket purchasing method of FIG. 6 to perform a purchase transaction that, if successful, assigns the tickets to the user for whom the purchasing method is invoked.

The method 500 may begin at step 502, where a user of a social-networking system 160, such as an event organizer 192, may use a client application or browser to request ticket availability information. A user may request ticket availability information when, for example, preparing to purchase tickets. The method 500 for requesting available tickets may also be executed in response to a user's request to purchase tickets if, for example, the user has not previously obtained ticket identifiers for the tickets to be purchased. If the user has not previously obtained ticket identifiers, the available tickets may be presented to the user, the user may select one or more of the available tickets to purchase, and the method 600 for purchasing tickets may then be executed with the selected available ticket identifier(s)s as input. At step 502, the client 130 may receive input parameters that describe the tickets to be requested, including an event name, venue name, date and time, number of desired tickets, and user identifier of the user requesting the tickets. At step 502, the client 130 may send a ticket availability request that includes these input parameters to the social-network server 162. At step 504, the social-network server 162 may receive the ticket availability request from the client 130 and send a similar request with the same or similar parameters to the third-party server 170. At step 506, the third-party server may receive the request and query the event database 174 for available tickets that satisfy the parameters received in the request. For example, at least the desired number of tickets having the event name, venue name, date and time specified in the request parameters may be available according to the event database 174. If the desired tickets are not available, e.g., because they have been sold or are being held for another user of the social-networking system, then an error is propagated back to the client 130, stating that at least one of the requested tickets is not available. If the requested tickets are available, then step 508 may request that those tickets be held for the user for a short time period, e.g., 10 minutes, 30 minutes, or other appropriate time. The tickets being held are unavailable to other users until the holding time period expires, at which time they are made available to other users if the requesting user has not purchased them. At step 510, the third-party server 170 sends a response indicating that the requested tickets are available and are being held for the requesting user. The response may include details of the reserved tickets, such as ticket identifiers and associated seats and tiers. The social-network server 162 may receive the response at step 512 and forward the information in the response to the client 130. The client 130 may display the ticket availability details at step 514.

Particular embodiments may repeat one or more steps of the method of FIG. 5, where appropriate. Although this disclosure describes and illustrates particular steps of the method of FIG. 5 as occurring in a particular order, this disclosure contemplates any suitable steps of the method of FIG. 5 occurring in any suitable order. Moreover, although this disclosure describes and illustrates an example method for requesting ticket availability including the particular steps of the method of FIG. 5, this disclosure contemplates any suitable method for requesting ticket availability, including any suitable steps, which may include all, some, or none of the steps of the method of FIG. 5, where appropriate. Furthermore, although this disclosure describes and illustrates particular components, devices, or systems carrying out particular steps of the method of FIG. 5, this disclosure contemplates any suitable combination of any suitable components, devices, or systems carrying out any suitable steps of the method of FIG. 5.

Figure 6:
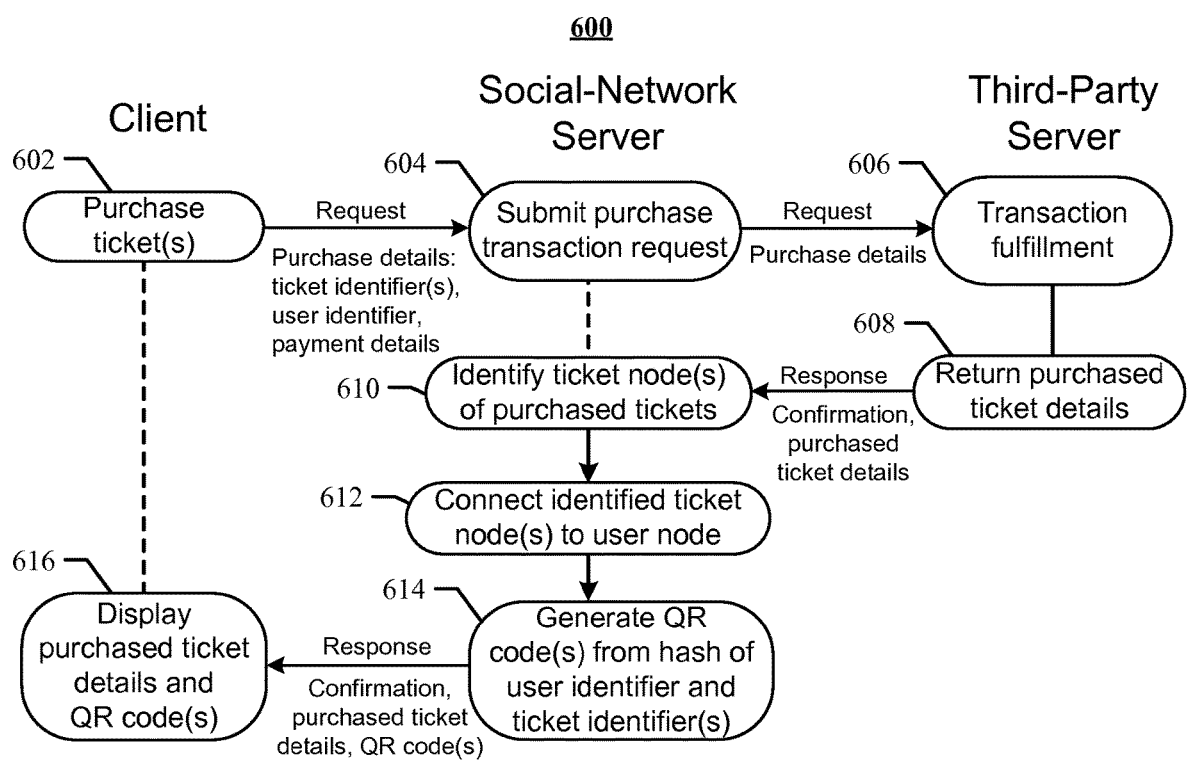
FIG. 6 illustrates an example method for purchasing tickets for events in a social-networking system.

FIG. 6 illustrates an example method 600 for purchasing tickets for events in a social-networking system. The method 600 may be invoked by client application or web browser on the client 130 to purchase one or more tickets having specified ticketed identifier(s). The ticket identifiers may be received from the method of FIG. 5, which requests and holds available tickets until they are purchased or the hold expires. If the method 600 is invoked without a set of ticket identifiers as input, then the ticket availability request method of FIG. 5 may be invoked at step 602 to request and receive a set of one or more ticket identifiers. Step 602 may send the purchase request to the social-network server 162. The purchase request includes purchase details, such as the ticket identifier(s), a user identifier that identifies the requesting user, and payment details, such as credit card information or other payment account information.

At step 604, the social-networking system 160 may receive the purchase request, map the ticket identifiers to a format understood by the third-party server 170 if appropriate, and send a purchase request, including the purchase details, to the third-party server 170. At step 606, the third-party server 170 may receive the purchase request and perform transaction fulfilment to assign the requested ticket(s) to the user in exchange for payment. The transaction fulfillment may, for example, update the event database 174 to show that the ticket(s) have been assigned to the user, and transfer an amount of money based on the ticket price from the user to the ticket seller. The ticket seller may be the third party, or another party to which the third-party server transfers at least a portion of the money received for the ticket(s). At step 608, the third-party server may send a response confirming the ticket purchase with details about the purchased tickets to the social-network server 162. The social-networking system 160 may identify the ticket node(s) that correspond to the purchased tickets at step 610, and connect the identified ticket node(s) to the user node of the user at step 612. At step 614, the social-networking system 160 may generate a code, e.g., a QR code, based on the ticket node(s) and the user node. The QR code may be generated using an encoder for the QR format to encode a one-way hash of a combination of the ticket node identifier and the user node identifier. The one-way hash may be generated using a one-way hash function such as MD5, SHA-1, or the like. A response may then be sent to the client 130 confirming the ticket purchase. The response may include the details of the purchased ticket(s) and the corresponding code(s). At step 616, the client 130 displays the purchased ticket details and codes. The purchased tickets may be represented as graphical images, which may be stored in the corresponding ticket nodes and displayed when the user views the tickets. Particular embodiments may repeat one or more steps of the method of FIG. 6, where appropriate.

Although this disclosure describes and illustrates particular steps of the method of FIG. 6 as occurring in a particular order, this disclosure contemplates any suitable steps of the method of FIG. 6 occurring in any suitable order. Moreover, although this disclosure describes and illustrates an example method for purchasing tickets including the particular steps of the method of FIG. 6, this disclosure contemplates any suitable method for purchasing tickets including any suitable steps, which may include all, some, or none of the steps of the method of FIG. 6, where appropriate. Furthermore, although this disclosure describes and illustrates particular components, devices, or systems carrying out particular steps of the method of FIG. 6, this disclosure contemplates any suitable combination of any suitable components, devices, or systems carrying out any suitable steps of the method of FIG. 6.

Figure 7:
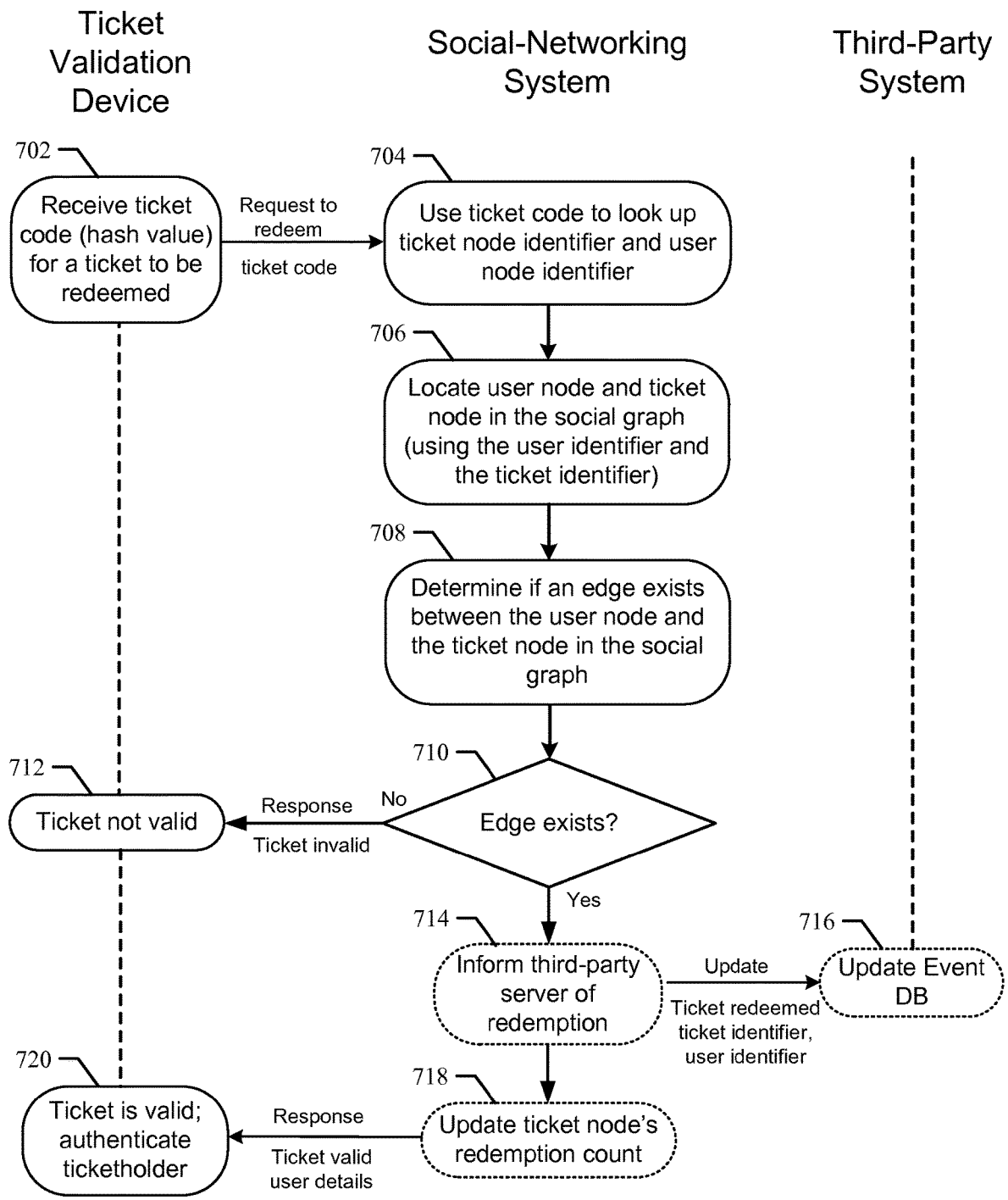
FIG. 7 illustrates an example method for redeeming event tickets in a social-networking system.

FIG. 7 illustrates an example method 700 for redeeming event tickets in a social-networking system. The method 700 of FIG. 7 may be invoked by a ticket validation device 180 such as a desktop computer, mobile device, or scanning device at the point of redemption, as described with reference to FIG. 11. The method 700 may begin at step 702, where ticket validation device 180 may receive a ticket code for a ticket to be validated, where the ticket code comprises a hash value. If the ticket code is a QR code, then ticket validation device 180 may decode the QR code to determine the ticket code. The ticket validation device 180 may alternatively receive the ticket code in text form, e.g., if the device is a desktop computer not equipped with an optical scanner, and so the ticket code was typed in to an online form. The ticket validation device 180 may send a request to redeem the ticket to the social-network server 162. The request may include the ticket code; in some embodiments, the request may comprise other information, such as a name or other identifying information for the ticketholder, a ticket identification number, or an event identifier. At step 704, upon receiving the request to redeem, the social-networking server 162 may use the hash value of the ticket code to look up a ticket node identifier and a user node identifier in a hash lookup table. At step 706, the social-networking server 162 may locate a ticket node (using the ticket node identifier) and a user node (using the user node identifier) in a social graph of the social-networking system. At step 708, the social-networking server 162 may determine if an edge exists between the user node and the ticket node in the social graph. At step 710, if such an edge does not exist, then a response will be sent back to ticket validation device 180 indicating that the social-networking server 162 determined that the submitted ticket code is invalid. Ticket validation device 180 may then display an indication that the ticket is invalid at step 712. If an edge exists between the ticket node and the user node, the ticket may be considered to be valid for the user associated with the user node. In particular embodiments, the social-networking server 162 may inform the third-party server 162 of the ticket's redemption by sending an update message or request at step 714. The third-party service 170 may update the event database 174 to indicate that the ticket has been redeemed at step 716. At step 718, the social-networking server 162 may update a redemption count associated with the ticket node (e.g., an attribute of the ticket node), which may be used to reject the ticket code as invalid if the another attempt is made to redeem the ticket. At step 718, the social-networking server 162 may send a response indicating that the ticket is valid for the user associated with the user node and including the user's identification details, such as a name, age, sex, height, profile picture(s), or the like, to the ticket validation device 180, which may then display such information in step 720 in order to enable the ticket validator person to authenticate the ticketholder and ensure that the ticketholder appears to be the user whose user node is connected to the ticket node for the ticket.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method for redeeming event tickets including the particular steps of the method of FIG. 7, this disclosure contemplates any suitable method for redeeming event tickets including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Figure 8:
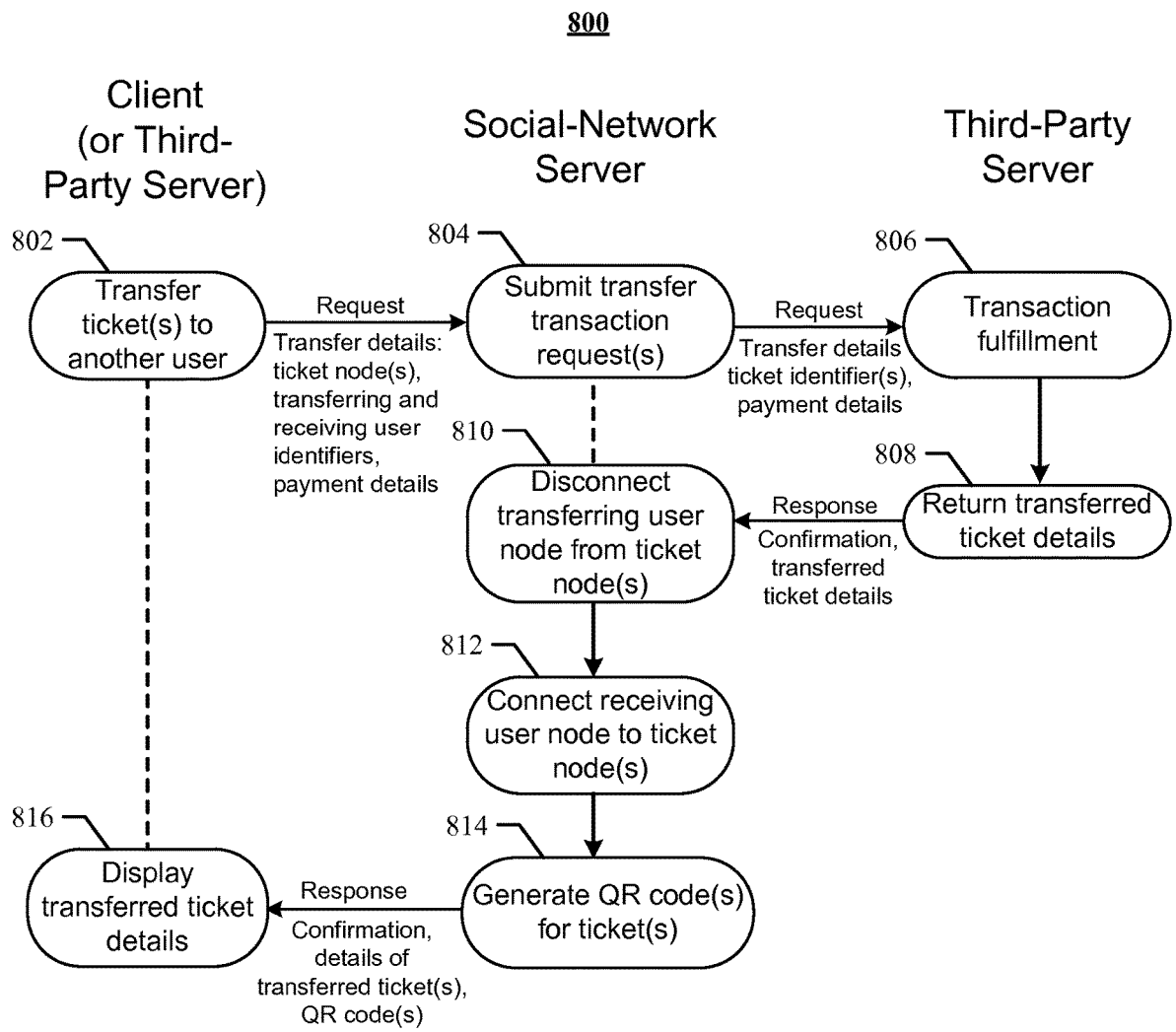
FIG. 8 illustrates an example method for transferring tickets for events in a social-networking system.

FIG. 8 illustrates an example method 800 for transferring tickets for events in a social-networking system. Tickets may be resold by conducting financial transactions between social-networking system users and transferring the tickets between the users. Users may agree on a price, select a Transfer button in a user interface such as that shown in FIG. 12, and the transfer is performed automatically. Several types of transfers may be provided, including transfer of a ticket between users, transfer of a ticket between tiers (by the event owner), transfer of a ticket from a user to an event or event owner (returning a ticket), and increasing or decreasing the number of unsold tickets in a ticket pool. A user may announce, e.g., via a post, that tickets are for sale for a particular event at a particular price, and any user who transfers a certain amount of money to the user will receive the corresponding number of tickets. For example, a user may post a message saying "If you transfer $10 to me, I will give my tickets to you." An escrow service may be used to ensure that a purchasing user acquires tickets only if payment is successfully received from the purchasing user.

In the user interface, the user's post announcing the sale of the tickets may be presented as a newsfeed story. Other users may purchase tickets from the newsfeed directly, e.g., by clicking on a purchase button or associated text or graphics in the newsfeed. The purchase button is linked to the event and can be used to buy the ticket from the user who currently owns it. Users may purchase tickets directly from the event page as well. If the ticket has not previously been purchased, it may be purchased from the event page. Any type of event may be used to cause the transfer of tickets between friends, friends of friends, and the like.

The method 800 may be invoked when a user requests a ticket transfer via a user interface of an application or browser on a client device 130. The method 800 may also be invoked in response to receiving a notification from the third-party server 170 that a ticket has been transferred between users, in which case the method does not perform transaction fulfillment on the third-party server. The method 800 may begin at step 802, where the client 802 may send a request to transfer a ticket from a transferring user to a receiving user. The request includes the ticket node of the ticket to be transferred (identified by a public identifier, since the ticket identifier may be kept secret to maintain the security of the ticket redemption method). The request may also include payment information if a payment is to be made from one user to another as part of the transfer. At step 804, the social-networking server 162 may submit a ticket transfer transaction request to the third-party server. The request may include the ticket identifier (derived from the ticket node or other ticket identifier) in a format used by the third-party server 170. The request may also include the payment details received from the client 130, if any. At step 806, the third-party server 162 may perform a transaction fulfillment operation that transfers the ticket to the receiving user and, if payment details are supplied, transfers the money accordingly. At step 808, the third-party server 162 may return confirmation and details of the transfer transaction to the social-networking server 162. At step 810, the social-networking server 162 may disconnect the transferring user's user node from the transferred ticket's ticket node. Step 812 may connect the receiving user node's user node to the ticket node. Step 814 may generate a ticket code for the transferred ticket based on a one-way hash of the receiving user's user identifier and the ticket identifier, generate a QR code image based on the ticket code, and send a response including the QR code and confirming the transfer to the client 130. The response may include the generated QR codes and details of the transferred ticket.

Particular embodiments may repeat one or more steps of the method of FIG. 8, where appropriate. Although this disclosure describes and illustrates particular steps of the method of FIG. 8 as occurring in a particular order, this disclosure contemplates any suitable steps of the method of FIG. 8 occurring in any suitable order. Moreover, although this disclosure describes and illustrates an example method for transferring tickets including the particular steps of the method of FIG. 8, this disclosure contemplates any suitable method for transferring tickets including any suitable steps, which may include all, some, or none of the steps of the method of FIG. 8, where appropriate. Furthermore, although this disclosure describes and illustrates particular components, devices, or systems carrying out particular steps of the method of FIG. 8, this disclosure contemplates any suitable combination of any suitable components, devices, or systems carrying out any suitable steps of the method of FIG. 8.

Figure 9A:
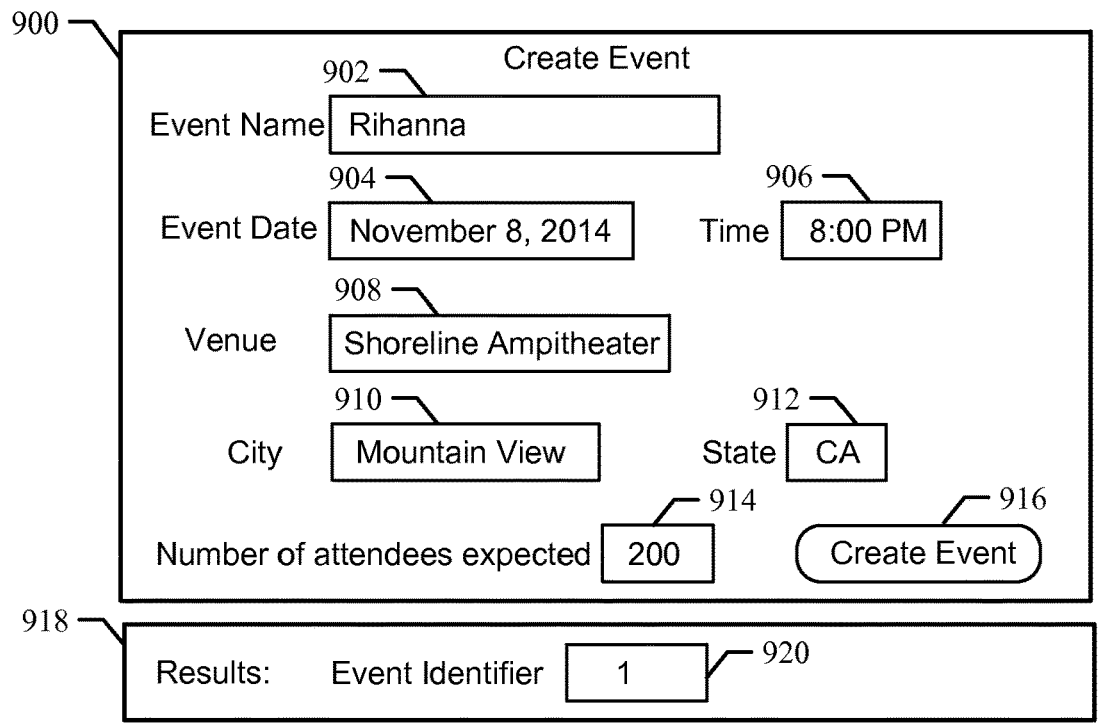
FIG. 9A illustrates an example user interface for creating events in a social-networking system.

FIG. 9A illustrates an example user interface 900 for creating events in a social-networking system. The user interface 900 may be presented to and interact with users 190 of the client system 130. For example, the user interface 900 may be displayed in a web browser 132 or client application on a display device of the client system 130, and may receive input, such as text in input field component 902 or selection of a button component 916. The user interface 900 may send information to and receive input from the user of the social-networking systems 190. The information displayed by the user interface 900 may be received by the client system 130 from the social-networking system 160. Input received by the user interface 900 may be sent from the client system 130 to the social-networking system 160.

In particular embodiments, the event creation user interface 900 may be displayed when a user 190 issues a command to create an event, e.g., by selecting a menu option, button, or the like in a page displayed in the web browser 132 or in an application executing on the client system 130. The user interface 900 includes an Event Name input field 902, in which a user may enter a name for the event being created, e.g., "Rihanna". The user interface 900 also includes an event data input field 904, an event time field 906, a venue field 908, a city field 910, and a state field 912, in which the user may enter the corresponding values, e.g., "November 8, 2014" for the event date field 904, "Shoreline Amphitheater" for the venue field 908, and so on. A number of expected attendees may be entered in an expected attendance field 914 to cause the social-networking system 160 to attempt to reserve a block of the specified number of tickets for exclusive use. The expected attendance field is optional, and if no number is entered, blocks of tickets may still be reserved in subsequent user interfaces, such as the ticket reservation interface 922 of FIG. 9B. Once the input values have been entered, a user may select, e.g., click on or touch, a Create Event button 916 to cause an event to be created in the social-networking system 160 based on the input values. For example, the Create Event button 916 may cause execution of the Create Event method of FIG. 4A. Once an event has been created, information about the event may be displayed in a results user interface 918. For example, an event identifier that uniquely identifies the event in the social-networking system 160 may be generated for each event and subsequently used to identify the event. The event identifier for the event created via the user interface 900 may be displayed in an Event Identifier field 920.

Figure 9B:
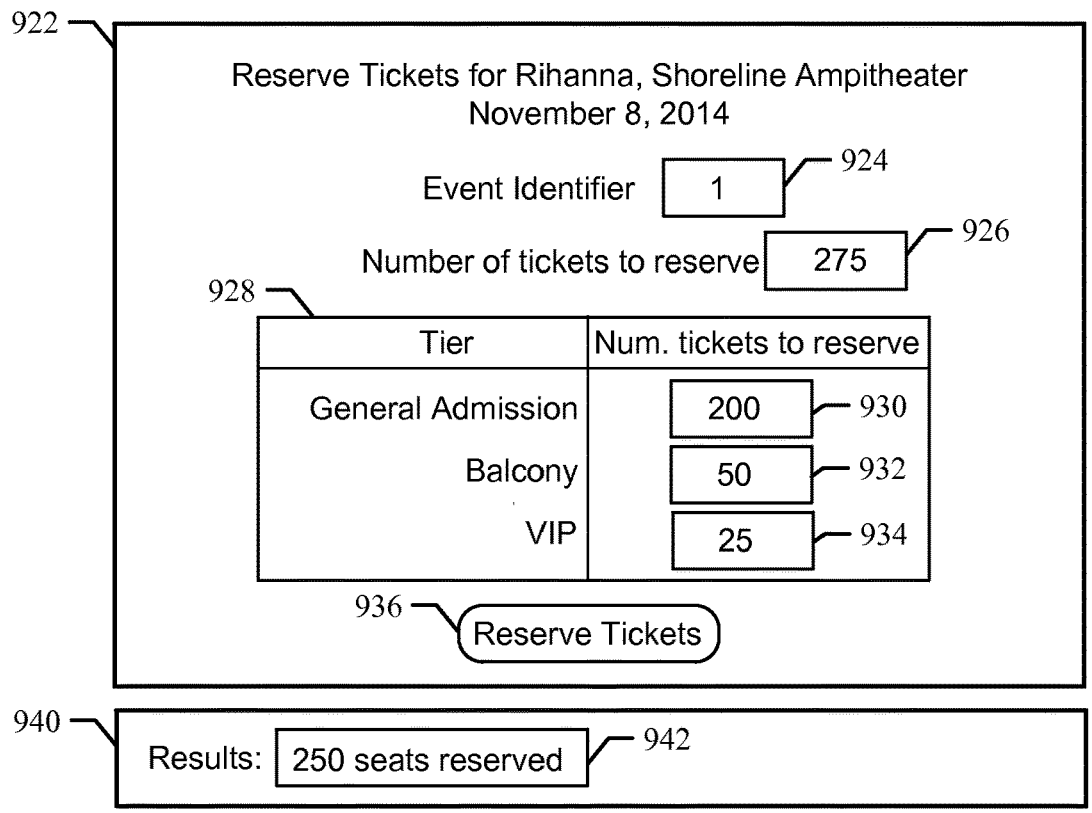
FIG. 9B illustrates an example user interface for reserving tickets for events in a social-networking system.

FIG. 9B illustrates an example user interface 922 for reserving blocks of tickets for events in a social-networking system. In particular embodiments, the block ticket reservation interface 922 may be displayed when a user 190 issues a command to reserve a block of one or more tickets for an event, e.g., by selecting a menu option, button, or the like in a page displayed in the web browser 132 or in an application executing on the client system 130. The user interface 922 displays the name of the event and includes input fields for receiving an event identifier 924 and a number of tickets to reserve 926. The event identifier 924 may refer to a previously-created event, such as an event created using the event creation interface 900 of FIG. 9A. The number of tickets to reserve 926 is optional when there are multiple ticket tiers, since the number of tickets to reserve in each tier may be received in an input table component 928. In this example, the user has entered 200, 50, and 25 as the numbers of tickets to reserve in the General Admission (GA) tier 930, Balcony tier 932, and VIP tier 934, respectively. Once the input data has been entered, the user may select a Reserve Tickets button 936 to cause the ticket reservation method 420 of FIG. 4B to execute and reserve a block of tickets in accordance with the values in the input fields of the user interface 922. The results of the ticket reservation method may be displayed in a user interface 940. For example, when the requested block of tickets is successfully reserved, a message 942, "250 tickets reserved," is displayed in the results 940.

FIG. 10A illustrates an example user interface 1000 for finding available tickets for an event in a social-networking system. In particular embodiments, the ticket search interface 1000 may be displayed when a user 190 issues a command to find one or more available tickets for an event, e.g., by selecting a menu option, button, or the like in a page displayed in the web browser 132 or in an application executing on the client system 130. The user interface 1000 includes input fields for receiving a number of tickets to find 1002 and an optional "adjacent" flag 1004, which, if selected, causes the ticket search operation to find only tickets having adjacent seats. The user interface 1000 also includes input fields for receiving information that identifies the particular event for which tickets are to be found. The event may be identified in by its attributes, such as one or more of the event name 1006, event date 1008, time 1010, venue 1012, city 1014, and state 1016. If values are supplied for one or more of these attributes, and a Find Tickets button 1022 is selected, then tickets having the specified values for those attributes are found and listed in an available tickets user interface 1024, as shown in FIG. 10B. An event identifier input field 1018 may receive an event identifier provided by the user instead of the event attributes, in which case one or more tickets for the event having the specified event identifier are found and listed in the available tickets user interface 1024 when the user selects the Find Tickets button 1022. A tier 1020, e.g., General Admission, Balcony, VIP, or Any tier may be selected, in which case tickets for the identified event in the specified tier (or any tier, if Any is selected) are found when the Find Tickets button 1022 is selected. The ticket availability request method 500 of FIG. 5 may be invoked to find the available tickets. The tickets that are found are displayed in the Available Tickets user interface 1024 of FIG. 10B.

FIG. 10B illustrates an example user interface 1024 for purchasing available tickets for events in a social-networking system. In particular embodiments, the ticket purchasing user interface 1024 may be displayed when a user 190 selects the Find Tickets button 1022 in the ticket search user interface of FIG. 10A. The user interface 1024 displays the event name and other identifying information, such as the venue, date, and time of the event in an event summary heading 1026. The user interface 1024 also displays a list of available tickets 1028, which may be generated by the ticket availability request method 500 of FIG. 5. In this example, the ticket list 1028 includes two General Admission tickets, a Balcony ticket, and a VIP ticket. The seat, price, and ticket identifier of each ticket are shown. A selection box also appears for each ticket. One or more tickets may be selected, e.g., by selecting their selection boxes, and the total number of tickets selected and total price of the selected tickets are displayed. The two General admission tickets are selected in FIG. 10B. The selected tickets may be purchased by selecting a Purchase button 1030.

Figure 10C:
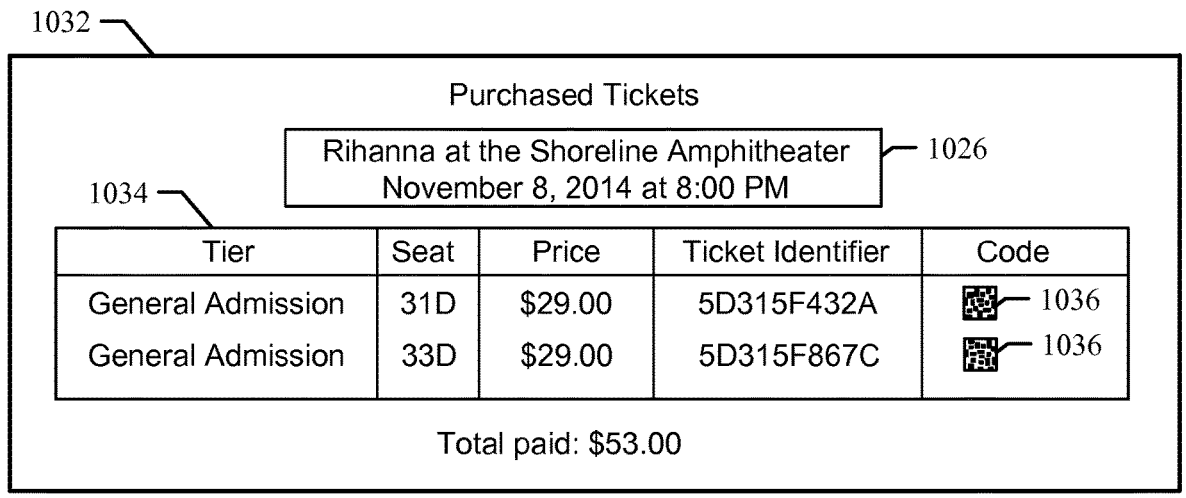
FIG. 10C illustrates an example user interface for displaying purchased ticket information in a social-networking system.

FIG. 10C illustrates an example user interface 1032 for displaying purchased ticket information in a social-networking system. In particular embodiments, the purchased tickets user interface 1032 may be displayed when a user 190 selects the Purchase Tickets button 1030 in the ticket purchase user interface of FIG. 10B and the ticket purchase transaction is successfully completed. The user interface 1032 displays the event name and details 1026 and a ticket list table 1034 that lists the purchased tickets. The tier, seat, price, ticket identifier, and QR code 1036 are shown for each purchased ticket. In this example, a purchase transaction for two General Admission tickets for a total price of $53 has been successfully completed.

Figure 11:
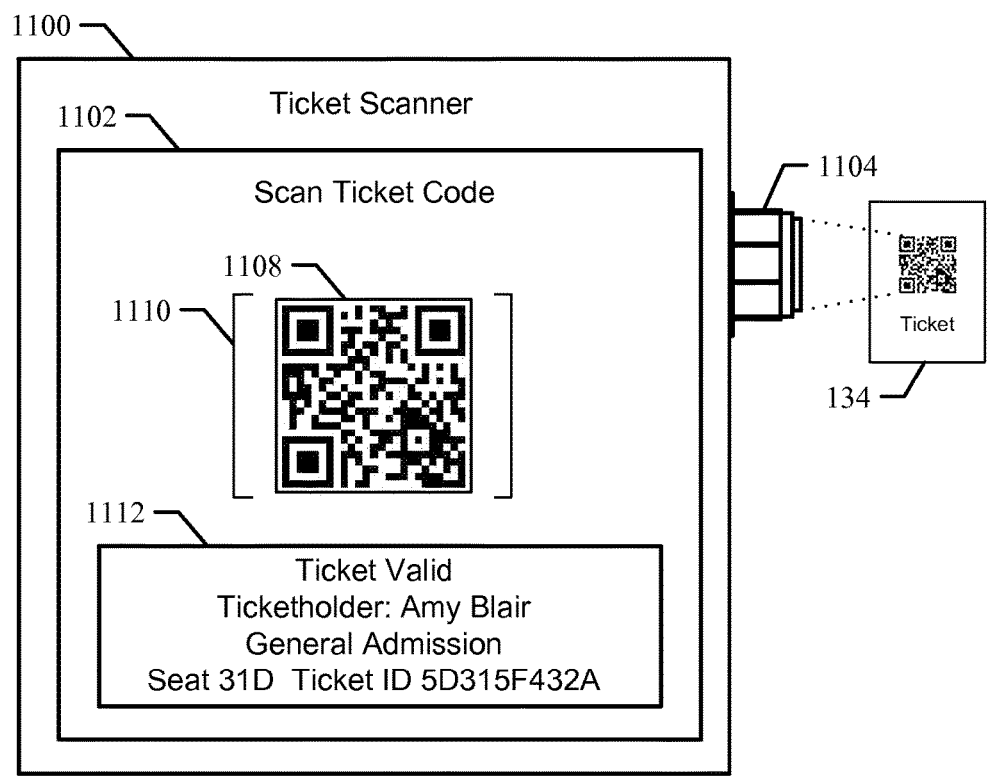
FIG. 11 illustrates an example ticket scanner user interface for redeeming tickets for events.

FIG. 11 illustrates an example ticket scanner user interface 1102 for redeeming tickets 134 for events. The ticket scanner user interface 1102 may be displayed on a screen of a ticket scanner 1100. In particular embodiments, the ticket scanner 1100 corresponds to the ticket validation device 180 shown in FIG. 1, and may be a handheld electronic scanning device that uses an optical scanner having a lens 1104 to capture an image 1108 encoding ticket code 136, such as a QR code or other ticket code printed or displayed on a ticket 134. The image 1108 may be generated and printed on or otherwise associated with the ticket at the time the ticket is purchased, e.g., at block 614 of FIG. 6. To scan ticket 134 at the point of ticket redemption, a ticket validator at the event venue may provide a ticket scanner 1100 with the lens 1104 pointed toward ticket 134, so that the image 1108 of the QR code on the ticket 134 is displayed in a region 1110 of the ticket scanner user interface. The ticket scanner 1100 may decode the image 1108, e.g., using a decoder for the QR format, to determine a ticket code 136, which may be a hash code of the user identifier and ticket identifier. The ticket code 136 may be compared to an expected hash code to determine whether the ticket 134 is valid using the method of FIG. 7. In particular embodiments, once ticket 134 is determined to be valid, ticket scanner 1100 may display information about ticketholder user 184 and ticket 134 in order to enable ticket validator to verify the user's identity (e.g., by asking the user for identification); in some embodiments, where the image 1108 is displayed on a client system 130 that is uniquely associated with the ticketholder user 184 in the social-networking system, user identity verification may be performed by having the client system 130 send a unique device identifier (e.g., by close-range wireless communication, such as Near Field Communication ("NFC")) to ticket scanner 1100 at the moment when the image 1108 is scanned.

Figure 12:
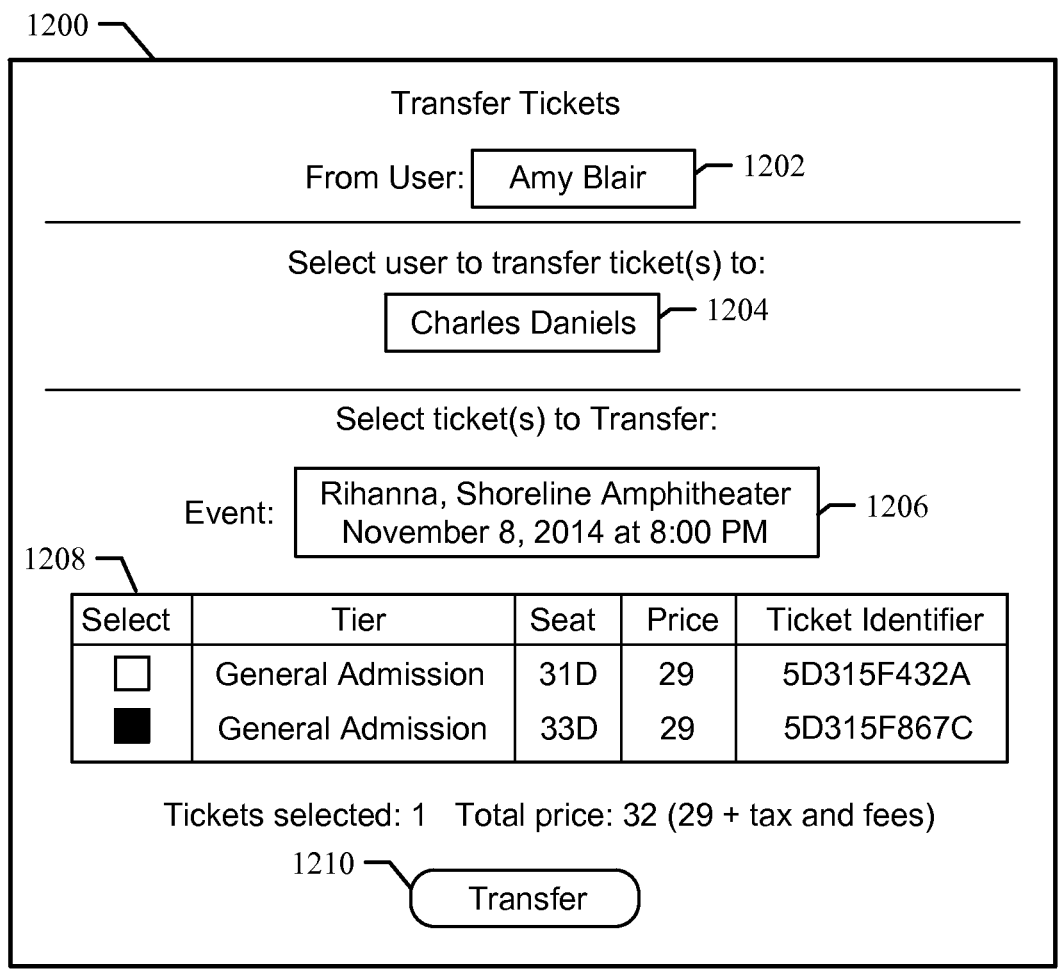
FIG. 12 illustrates an example user interface for transferring tickets for events in a social-networking system.

FIG. 12 illustrates an example user interface 1200 for transferring tickets for events in a social-networking system. A user of the social-networking system, such as an event organizer 192 or a ticket holder 194, may use the ticket transfer user interface 1200 to transfer one or more tickets from a first user to a second user. In particular embodiments, a ticket holder 194 may transfer tickets that they hold to any other selected user, but may not transfer tickets from other users. Therefore, if the first user is a ticket holder 194, the first user's name is displayed as a static text field 1202. An event organizer 192, however, can transfer tickets from any user to any other user. When invoked by an event organizer 192, the user interface 1200 may include a first input field 1202 for receiving a name of the first user. The user interface 1200 includes a second input field 1204 for receiving a name of the second user. As described above, the second input field 1204 may be present regardless of whether the invoking user is an event organizer 192 or a ticket holder 194, since both types of users may select the user to whom a transfer is to be made. The name and details of one or more events for which the first user 1202 holds tickets are shown in an event name field 1206. One of the events 1206 may be selected, e.g., the "Rihanna" event shown in FIG. 12. The tickets held by the first user 1202 for the selected event 1206 are listed in a ticket list 1208. The illustrated ticket list 1208 includes two General Admission tickets for seats 31D and 33D. One or more of the tickets in the list 1208 may be selected for transfer to the second user 1204. In this example, the ticket for seat 33D is selected. A transfer button 1210 may be selected to cause the selected ticket(s) to be transferred from the first user 1202 to the second user 1204. The ticket transfer may be performed by the method shown in FIG. 8. In other embodiments, a ticket transfer option may be provided on an event page that represents the event associated with the ticket. The user interface 1200 may enable users to perform other operations on tickets, such as changing the tier of a group of tickets.

Figure 13:
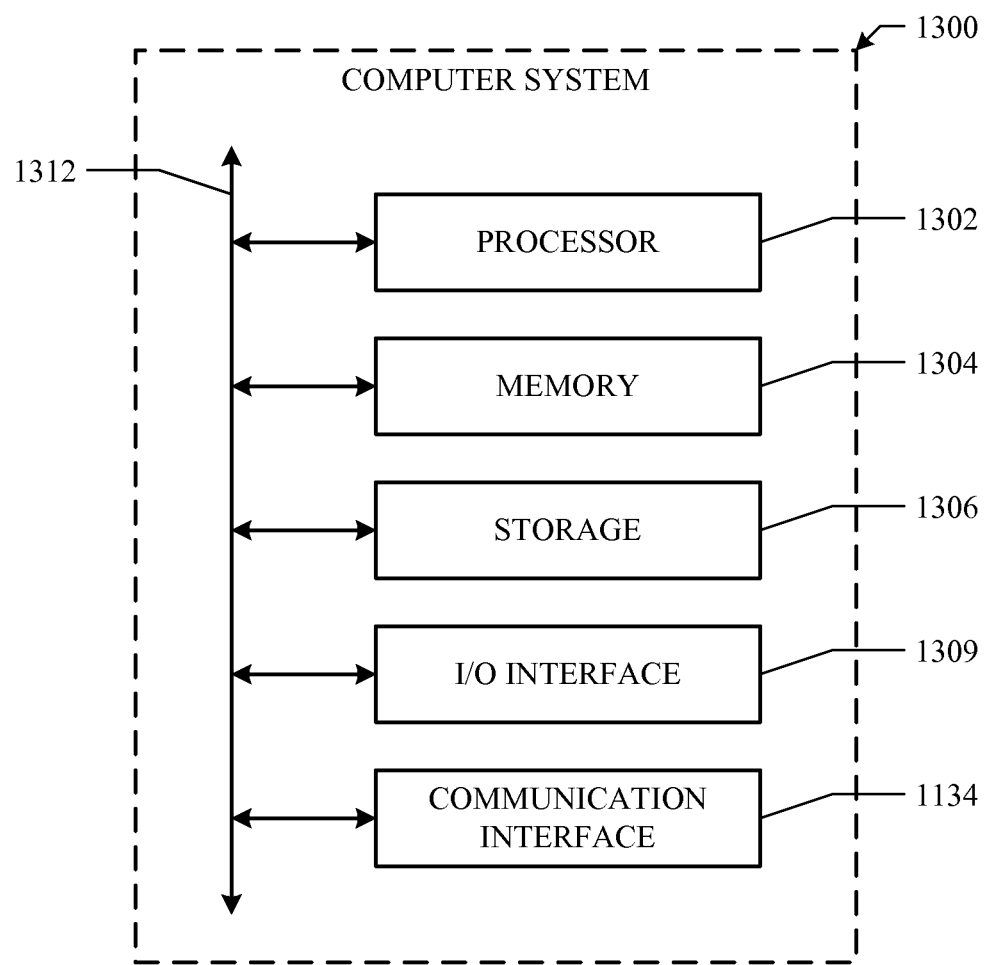
FIG. 13 illustrates an example computer system.

FIG. 13 illustrates an example computer system 1300. In particular embodiments, one or more computer systems 1300 perform one or more steps of one or more methods described or illustrated herein. In particular embodiments, one or more computer systems 1300 provide functionality described or illustrated herein. In particular embodiments, software running on one or more computer systems 1300 performs one or more steps of one or more methods described or illustrated herein or provides functionality described or illustrated herein. Particular embodiments include one or more portions of one or more computer systems 1300. Herein, reference to a computer system may encompass a computing device, and vice versa, where appropriate. Moreover, reference to a computer system may encompass one or more computer systems, where appropriate.

This disclosure contemplates any suitable number of computer systems 1300. This disclosure contemplates computer system 1300 taking any suitable physical form. As example and not by way of limitation, computer system 1300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1300 may include one or more computer systems 1300; be unitary or distributed; span multiple locations; span multiple machines; span multiple data centers; or reside in a cloud, which may include one or more cloud components in one or more networks. Where appropriate, one or more computer systems 1300 may perform without substantial spatial or temporal limitation one or more steps of one or more methods described or illustrated herein. As an example and not by way of limitation, one or more computer systems 1300 may perform in real time or in batch mode one or more steps of one or more methods described or illustrated herein. One or more computer systems 1300 may perform at different times or at different locations one or more steps of one or more methods described or illustrated herein, where appropriate.

In particular embodiments, computer system 1300 includes a processor 1302, memory 1304, storage 1306, an input/output (I/O) interface 1308, a communication interface 1310, and a bus 1312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1302 includes hardware for executing instructions, such as those making up a computer program. As an example and not by way of limitation, to execute instructions, processor 1302 may retrieve (or fetch) the instructions from an internal register, an internal cache, memory 1304, or storage 1306; decode and execute them; and then write one or more results to an internal register, an internal cache, memory 1304, or storage 1306. In particular embodiments, processor 1302 may include one or more internal caches for data, instructions, or addresses. This disclosure contemplates processor 1302 including any suitable number of any suitable internal caches, where appropriate. As an example and not by way of limitation, processor 1302 may include one or more instruction caches, one or more data caches, and one or more translation lookaside buffers (TLBs). Instructions in the instruction caches may be copies of instructions in memory 1304 or storage 1306, and the instruction caches may speed up retrieval of those instructions by processor 1302. Data in the data caches may be copies of data in memory 1304 or storage 1306 for instructions executing at processor 1302 to operate on; the results of previous instructions executed at processor 1302 for access by subsequent instructions executing at processor 1302 or for writing to memory 1304 or storage 1306; or other suitable data. The data caches may speed up read or write operations by processor 1302. The TLBs may speed up virtual-address translation for processor 1302. In particular embodiments, processor 1302 may include one or more internal registers for data, instructions, or addresses. This disclosure contemplates processor 1302 including any suitable number of any suitable internal registers, where appropriate. Where appropriate, processor 1302 may include one or more arithmetic logic units (ALUs); be a multi-core processor; or include one or more processors 1302. Although this disclosure describes and illustrates a particular processor, this disclosure contemplates any suitable processor.

In particular embodiments, memory 1304 includes main memory for storing instructions for processor 1302 to execute or data for processor 1302 to operate on. As an example and not by way of limitation, computer system 1300 may load instructions from storage 1306 or another source (such as, for example, another computer system 1300) to memory 1304. Processor 1302 may then load the instructions from memory 1304 to an internal register or internal cache. To execute the instructions, processor 1302 may retrieve the instructions from the internal register or internal cache and decode them. During or after execution of the instructions, processor 1302 may write one or more results (which may be intermediate or final results) to the internal register or internal cache. Processor 1302 may then write one or more of those results to memory 1304. In particular embodiments, processor 1302 executes only instructions in one or more internal registers or internal caches or in memory 1304 (as opposed to storage 1306 or elsewhere) and operates only on data in one or more internal registers or internal caches or in memory 1304 (as opposed to storage 1306 or elsewhere). One or more memory buses (which may each include an address bus and a data bus) may couple processor 1302 to memory 1304. Bus 1312 may include one or more memory buses, as described below. In particular embodiments, one or more memory management units (MMUs) reside between processor 1302 and memory 1304 and facilitate accesses to memory 1304 requested by processor 1302. In particular embodiments, memory 1304 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1304 may include one or more memories 1304, where appropriate. Although this disclosure describes and illustrates particular memory, this disclosure contemplates any suitable memory.

In particular embodiments, storage 1306 includes mass storage for data or instructions. As an example and not by way of limitation, storage 1306 may include a hard disk drive (HDD), a floppy disk drive, flash memory, an optical disc, a magneto-optical disc, magnetic tape, or a Universal Serial Bus (USB) drive or a combination of two or more of these. Storage 1306 may include removable or non-removable (or fixed) media, where appropriate. Storage 1306 may be internal or external to computer system 1300, where appropriate. In particular embodiments, storage 1306 is non-volatile, solid-state memory. In particular embodiments, storage 1306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1306 taking any suitable physical form. Storage 1306 may include one or more storage control units facilitating communication between processor 1302 and storage 1306, where appropriate. Where appropriate, storage 1306 may include one or more storages 1306. Although this disclosure describes and illustrates particular storage, this disclosure contemplates any suitable storage.

In particular embodiments, I/O interface 1308 includes hardware, software, or both, providing one or more interfaces for communication between computer system 1300 and one or more I/O devices. Computer system 1300 may include one or more of these I/O devices, where appropriate. One or more of these I/O devices may enable communication between a person and computer system 1300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1308 for them. Where appropriate, I/O interface 1308 may include one or more device or software drivers enabling processor 1302 to drive one or more of these I/O devices. I/O interface 1308 may include one or more I/O interfaces 1308, where appropriate. Although this disclosure describes and illustrates a particular I/O interface, this disclosure contemplates any suitable I/O interface.

In particular embodiments, communication interface 1310 includes hardware, software, or both providing one or more interfaces for communication (such as, for example, packet-based communication) between computer system 1300 and one or more other computer systems 1300 or one or more networks. As an example and not by way of limitation, communication interface 1310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1310 for it. As an example and not by way of limitation, computer system 1300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1300 may include any suitable communication interface 1310 for any of these networks, where appropriate. Communication interface 1310 may include one or more communication interfaces 1310, where appropriate. Although this disclosure describes and illustrates a particular communication interface, this disclosure contemplates any suitable communication interface.

In particular embodiments, bus 1312 includes hardware, software, or both coupling components of computer system 1300 to each other. As an example and not by way of limitation, bus 1312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1312 may include one or more buses 1312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   by a computer system, identifying an event corresponding to an event node of a social graph associated with a social-networking system, wherein the social graph comprises a plurality of nodes and a plurality of edges connecting the nodes, and the event node is connected to a plurality of ticket nodes corresponding to tickets for the event, the nodes comprising:
   a first user node corresponding to a first user of the social-networking system; and
   a plurality of second nodes each corresponding to a concept or to one of a plurality of second users of the social-networking system;
   by the computer system, receiving a request to assign a selected one of the tickets for the event to the first user; and
   by the computer system, in response to receiving the request to assign the selected ticket, creating an edge between the first user node and a selected one of the ticket nodes, wherein the selected ticket node corresponds to the selected ticket, and wherein the edge comprises a data object corresponding to a relationship between the first user node and the selected ticket node, the relationship indicating that the selected ticket is owned by the first user;

by the computer system, generating a machine-readable ticket code comprising a hash value based on a combination of an identifier for the first user node and an identifier for the selected ticket node;

by the computer system, sending the machine-readable ticket code to a client system associated with the first user;

by the computer system, receiving the machine-readable ticket code from a computer system associated with a point of redemption; and by the computer system, validating the machine-readable ticket code by retrieving the identifier for the first user node and the identifier for the selected ticket node from the hash value and determining that the edge connecting the first user node and the selected ticket node exists in the social graph.

2. The method of claim 1, wherein for at least one of the ticket nodes, a connection between the event node and the at least one ticket node comprises an edge between the event node and the ticket node.

3. The method of claim 1, wherein for each ticket node in a subset of the ticket nodes, a connection between the event node and the ticket node in the subset comprises:
an edge between the event node and a ticket pool node; and
an edge between the ticket pool node and the ticket node in the subset.

4. The method of claim 3, wherein the ticket pool node is associated with a ticket tier that corresponds to a type of access to the event.

5. The method of claim 1, wherein the ticket code comprises an image encoding the hash value.

6. The method of claim 1, further comprising:
by the computer system, receiving a request to transfer the selected ticket from the first user to an identified one of the second users; and
by the computer system, transferring the selected ticket from the first user to the identified second user by:
deleting the edge between the first user node and the selected ticket node; and
creating an edge between the selected ticket node and the second node corresponding to the second user.

7. The method of claim 6, wherein the transferring the selected ticket from the first user to the identified second user is executed in response to receiving confirmation of payment of a ticket price associated with the selected ticket.

8. The method of claim 1, further comprising:
by the computer system, receiving a request from a requesting user to redeem a presented ticket;
by the computer system, determining that the presented ticket is valid; and
by the computer system, granting the request to redeem the ticket.

9. The method of claim 8, wherein the determining that the presented ticket is valid comprises:
by the computer system, determining that the requesting user is associated with a requesting user node of the social graph; and
by the computer system, determining that the requesting user node is connected by an edge to one of the ticket nodes corresponding to the presented ticket.

10. The method of claim 9, wherein the determining that the requesting user is associated with a requesting user node of the social graph comprises:

by the computer system, authenticating an identity of the requesting user; and by the computer system, determining an identifier for the requesting user node, wherein the requesting user node is associated with information corresponding to the identity of the requesting user.

11. The method of claim 1, further comprising:
by the computer system, receiving a request to create one or more new tickets for the event; and
by the computer system, creating the new tickets, wherein creating each one of the new tickets comprises:
creating a new ticket node that corresponds to the new ticket, and
creating a connection between the new ticket node and the event node in the social graph.

12. The method of claim 11, further comprising:
by the computer system, storing, in the new ticket node, an event identifier that corresponds to the event.

13. The method of claim 1, further comprising:
by the computer system, determining a ticket price for the selected ticket; and
by the computer system, presenting the ticket price to the first user.

14. The method of claim 13, wherein the ticket price is based on: the first user's interactions with one or more entities related to the event, an affinity between the first user and the event node corresponding to the event, a degree of closeness in the social graph between the first user and an organizer of the event, or a history of communications between the first user and an organizer of the event.

15. One or more computer-readable non-transitory storage media embodying software that is operable when executed to:
identify an event corresponding to an event node of a social graph associated with a social-networking system, wherein the social graph comprises a plurality of nodes and a plurality of edges connecting the nodes, and the event node is connected to a plurality of ticket nodes corresponding to tickets for the event, the nodes comprising:
a first user node corresponding to a first user of the social-networking system; and
a plurality of second nodes each corresponding to a concept or to one of a plurality of second users of the social-networking system;
receive a request to assign a selected one of the tickets for the event to the first user; and
in response to receiving the request to assign the selected ticket, create an edge between the first user node and a selected one of the ticket nodes, wherein the selected ticket node corresponds to the selected ticket, and wherein the edge comprises a data object corresponding to a relationship between the first user node and the selected ticket node, the relationship indicating that the selected ticket is owned by the first user;
generate a machine-readable ticket code comprising a hash value based on a combination of an identifier for the first user node and an identifier for the selected ticket node;
send the machine-readable ticket code to a client system associated with the first user;
receive the machine-readable ticket code from a computer system associated with a point of redemption; and
validate the machine-readable ticket code by retrieving the identifier for the first user node and the identifier for the selected ticket node from the hash value and determining that the edge connecting the first user node and the selected ticket node exists in the social graph.

16. The media of claim 15, wherein the software is further operable when executed to:
receive a request from a requesting user to redeem a presented ticket;
determine that the presented ticket is valid; and
grant the request to redeem the ticket.

17. A system comprising:
one or more processors; and
a memory coupled to the processors comprising instructions executable by the processors, the processors being operable when executing the instructions to:
identify an event corresponding to an event node of a social graph associated with a social-networking system, wherein the social graph comprises a plurality of nodes and a plurality of edges connecting the nodes, and the event node is connected to a plurality of ticket nodes corresponding to tickets for the event, the nodes comprising:
   a first user node corresponding to a first user of the social-networking system; and
   a plurality of second nodes each corresponding to a concept or to one of a plurality of second users of the social-networking system;
receive a request to assign a selected one of the tickets for the event to the first user; and
in response to receiving the request to assign the selected ticket, create an edge between the first user node and a selected one of the ticket nodes, wherein the selected ticket node corresponds to the selected ticket, and wherein the edge comprises a data object corresponding to a relationship between the first user node and the selected ticket node, the relationship indicating that the selected ticket is owned by the first user;
generate a machine-readable ticket code comprising a hash value based on a combination of an identifier for the first user node and an identifier for the selected ticket node;
send the machine-readable ticket code to a client system associated with the first user;
receive the machine-readable ticket code from a computer system associated with a point of redemption; and
validate the machine-readable ticket code by retrieving the identifier for the first user node and the identifier for the selected ticket node from the hash value and determining that the edge connecting the first user node and the selected ticket node exists in the social graph.

* * * * *